US006974518B2

(12) United States Patent
Hornung et al.

(10) Patent No.: US 6,974,518 B2
(45) Date of Patent: Dec. 13, 2005

(54) METHOD FOR FABRICATING AN INTEGRATED MULTIPANE WINDOW SASH

(75) Inventors: Robert Hornung, Southport, CT (US); John S. France, Cuyahoga Falls, OH (US)

(73) Assignee: Sashlite, LLC, Westport, CT (US)

(*) Notice: Subject to any disclaimer, the term of this patent is extended or adjusted under 35 U.S.C. 154(b) by 268 days.

(21) Appl. No.: 09/925,293

(22) Filed: Aug. 9, 2001

(65) Prior Publication Data

US 2002/0189743 A1 Dec. 19, 2002

Related U.S. Application Data

(63) Continuation-in-part of application No. 09/882,295, filed on Jun. 15, 2001, now Pat. No. 6,662,523.

(51) Int. Cl.[7] .................................... C03C 27/10

(52) U.S. Cl. ................ 156/109; 52/204.593; 52/204.6; 52/204.62

(58) Field of Search .................... 156/109; 52/204.593, 52/204.595, 204.6, 204.61, 204.62, 204.705; 428/34

(56) References Cited

U.S. PATENT DOCUMENTS

| | | | |
|---|---|---|---|
| 309,636 | A | 12/1884 | Mann |
| 2,563,378 | A | 8/1951 | Schnee |
| 2,993,242 | A | 7/1961 | Leisibach |

(Continued)

FOREIGN PATENT DOCUMENTS

| | | |
|---|---|---|
| CA | 728445 | 2/1966 |
| DE | 951 040 | 10/1956 |
| DE | 24 49 726 | 4/1976 |

(Continued)

OTHER PUBLICATIONS

Marketing brochure entitled "The most advanced Insulating Glass System for today's most advance windows . . . ", Edgetech IG Inc., Cambridge, Ohio, May 1997.
Product Information Sheet, "Super Spacer Architectural S–Class", Edgetech IG Inc., Cambridge, Ohio, Sep. 1999.
Product Information Sheet, "Super Spacer Slimline S–Class", Edgetech IG Inc., Cambridge, Ohio, Sep. 1999.
Product Information Sheet, "Super Spacer Slimline E–Class", Edgetech IG Inc., Cambridge, Ohio, Sep. 1999.
Technical Data Sheet, "Super Spacer Cushion Edge", Edgetech IG Inc., Cambridge, Ohio, Dec. 1999.
Warm Edge Digest, North American Edition, vol. 1, No. 1, Edgetech IG Inc., Cambridge, Ohio, Winter 1997/98.
Warm Edge Digest, North American Edition, vol. 2, No. 2, Edgetech IG Inc., Cambridge, Ohio, Summer 1999.

*Primary Examiner*—Jeff H. Aftergut
*Assistant Examiner*—Jessica Rossi
(74) *Attorney, Agent, or Firm*—Lipsitz & McAllister, LLC

(57) ABSTRACT

A window sash frame is provided with a glazing pane installation opening accessible from a first side thereof and a glazing pane support surface on a second side thereof. A first glazing pane is inserted into the installation opening and an outside surface perimeter of the pane is placed adjacent to the support surface. A second glazing pane is then inserted into the opening. An inside surface perimeter of the second pane is mounted (e.g., via an adhesive bead, strip, tape or foam) to an inside surface perimeter of the first glazing pane. The adhesive thickness is such that the panes are separated by a space, which can contain air or an inert insulating gas. A glazing bead is installed along at least a portion of the glazing pane installation opening after the glazing panes have been inserted. A spacer can alternatively or additionally be provided between the glazing panes.

42 Claims, 18 Drawing Sheets

U.S. PATENT DOCUMENTS

| | | | | |
|---|---|---|---|---|
| 3,008,196 | A | | 11/1961 | Springer et al. |
| 3,030,673 | A | | 4/1962 | London |
| 3,054,153 | A | | 9/1962 | Partsch |
| 3,573,149 | A | * | 3/1971 | Tibble et al. ............... 156/101 |
| 3,667,179 | A | * | 6/1972 | Eisenberg .................... 52/209 |
| 3,775,914 | A | | 12/1973 | Patil |
| 3,791,910 | A | | 2/1974 | Bowser |
| 3,872,198 | A | | 3/1975 | Britton |
| 3,919,023 | A | | 11/1975 | Bowser et al. |
| 3,990,196 | A | | 11/1976 | Eddins |
| 4,015,394 | A | | 4/1977 | Kessler |
| 4,055,031 | A | | 10/1977 | Okawa et al. |
| 4,109,432 | A | | 8/1978 | Pilz |
| 4,149,348 | A | | 4/1979 | Pyzewski |
| 4,198,254 | A | * | 4/1980 | Laroche et al. ............. 156/107 |
| 4,207,869 | A | | 6/1980 | Hart |
| 4,208,849 | A | | 6/1980 | Lamb |
| 4,368,226 | A | | 1/1983 | Mucaria |
| 4,407,105 | A | | 10/1983 | Frank |
| 4,454,703 | A | | 6/1984 | Sitzler et al. |
| 4,459,789 | A | | 7/1984 | Ford |
| 4,464,874 | A | | 8/1984 | Shea, Jr. et al. |
| 4,479,988 | A | | 10/1984 | Dawson |
| 4,499,703 | A | | 2/1985 | Rundo |
| 4,552,790 | A | | 11/1985 | Francis |
| 4,564,540 | A | | 1/1986 | Davies et al. |
| 4,608,796 | A | | 9/1986 | Shea, Jr. |
| 4,652,472 | A | | 3/1987 | Davies |
| 4,753,056 | A | | 6/1988 | Pacca |
| 4,791,762 | A | | 12/1988 | Hwang |
| 4,831,799 | A | | 5/1989 | Glover et al. |
| 4,850,175 | A | | 7/1989 | Berdan |
| 4,873,803 | A | | 10/1989 | Rundo |
| 4,928,448 | A | | 5/1990 | Phillip |
| 4,994,309 | A | | 2/1991 | Reichert et al. |
| 5,007,217 | A | | 4/1991 | Glover et al. |
| 5,061,531 | A | | 10/1991 | Catalano |
| 5,097,642 | A | | 3/1992 | Richardson et al. |
| 5,106,663 | A | | 4/1992 | Box |
| 5,107,655 | A | | 4/1992 | Lindgren |
| 5,177,916 | A | | 1/1993 | Misera et al. |
| 5,251,417 | A | | 10/1993 | Yates, Jr. |
| 5,295,292 | A | | 3/1994 | Leopold |
| 5,313,761 | A | * | 5/1994 | Leopold .................... 52/786.1 |
| 5,364,921 | A | | 11/1994 | Gray et al. |
| 5,437,902 | A | | 8/1995 | Itoh et al. |
| 5,494,715 | A | | 2/1996 | Glover |
| 5,533,314 | A | | 7/1996 | Kunert |
| 5,544,454 | A | | 8/1996 | Richardson et al. |
| 5,568,714 | A | | 10/1996 | Peterson |
| 5,640,828 | A | | 6/1997 | Reeves et al. |
| 5,653,073 | A | | 8/1997 | Palmer |
| 5,665,823 | A | | 9/1997 | Saxena et al. |
| 5,813,191 | A | | 9/1998 | Gallagher |
| 5,950,398 | A | | 9/1999 | Hubbard |
| 6,055,783 | A | | 5/2000 | Guhl et al. |
| 6,131,364 | A | | 10/2000 | Peterson |
| 6,209,269 | B1 | | 4/2001 | Valderrama |
| 6,260,251 | B1 | * | 7/2001 | Guhl ........................... 29/416 |
| 6,286,288 | B1 | | 9/2001 | France |
| 6,295,788 | B2 | | 10/2001 | Reichert |
| 6,301,843 | B1 | * | 10/2001 | Silverman .................. 52/204.5 |
| 6,401,428 | B1 | | 6/2002 | Glover et al. |
| 2003/0089054 | A1 | * | 5/2003 | Hornung |

FOREIGN PATENT DOCUMENTS

| | | |
|---|---|---|
| DE | 24 57 472 | 6/1976 |
| DE | 26 14 049 | 6/1976 |
| DE | 26 07 287 | 8/1977 |
| DE | 27 23 283 | 4/1979 |
| DE | 38 25 580 | 2/1990 |
| EP | 0 065 510 | 11/1982 |
| EP | 0 328 823 | 8/1989 |
| EP | 0 381 646 | 8/1990 |
| EP | 0 412 224 | 2/1991 |
| EP | 1 052 362 A2 | 11/2000 |
| FR | 1531163 | 6/1968 |
| FR | 2 301 678 | 9/1976 |
| FR | 2420014 | 11/1979 |
| FR | 2501773 | 9/1982 |
| FR | 2612244 | 9/1988 |
| FR | 2624545 | 6/1989 |
| FR | 2648178 | 12/1990 |
| FR | 2 653 470 | 4/1991 |
| FR | 2 672 930 | 8/1992 |
| FR | 2708030 | 1/1995 |
| GB | 237987 | 6/1925 |
| GB | 949997 | 2/1964 |
| GB | 1141281 | 1/1969 |
| GB | 1 535 173 | 12/1978 |
| GB | 2 077 834 | 12/1981 |
| GB | 2 254 358 | 10/1992 |
| SU | 726293 | 4/1980 |
| WO | 91/08366 | 6/1991 |
| WO | 98/02632 | 1/1998 |
| WO | 98/25001 | 6/1998 |

* cited by examiner

METHOD FOR FABRICATING AN INTEGRATED MULTIPANE WINDOW SASH

This application is a continuation-in-part of commonly assigned, U.S. patent application Ser. No. 09/882,295 filed Jun. 15, 2001, now U.S. Pat. No. 6,662,523.

BACKGROUND OF THE INVENTION

1. Field of the Invention

The present invention relates generally to residential, commercial, and architectural windows and, more particularly, to a method for manufacturing an integrated multipane window unit and sash assembly.

2. Description of the Related Art

As is currently well-known in the art, insulating glass units, or IG units, are widely used as elements of windows, skylights, doors and related products, including vehicles. Such units are used to reduce heat loss from building interiors in winter, and reduce heat gain into air-conditioned buildings in summer. The insulating glass units are typically formed separately from the sash, and then in a separate step the insulating glass unit is installed in a sash.

A detailed description of the manufacture and installation of conventional IG units can be found in J. France U.S. patent application Ser. No. 09/307,825 filed on May 7, 1999, entitled "Integrated Multipane Window Unit and Sash Assembly and Method for Manufacturing the Same", now U.S. Pat. No. 6,286,288, corresponding to PCT published application WO 00/68539 dated Nov. 16, 2000, both incorporated herein by reference. In addition to providing a comprehensive explanation of the prior art, the aforementioned patent discloses an improved but less complex insulating glass structure that is integrated with the window sash.

More particularly, the aforementioned patent discloses a multipane window unit in which a sash frame is formed having an integral spacing structure upon which glazing panes are directly affixed. The integral spacing structure provides vertical internal glazing surfaces extending from the sash. Adhesive can be affixed to the vertical internal glazing surfaces to attach the glazing panes. In this manner, a rigid, structural sash frame is formed prior to attachment of the glazing panes, thereby eliminating the need for using separately manufactured insulating glass units, while obtaining similar and improved thermal benefits.

The present invention provides further improvements to the manufacture of insulating glass structures for use in windows, doors and the like, while incorporating the basic concept of the aforementioned patent, i.e., the provision of a sash and IG unit in an integrated structure. In particular, the present invention provides, inter alia, an integrated insulating glass and sash manufacturing method where parallel glass panes are inserted directly into the sash and mounted by an adhesive mounting or an adhesive mounting and spacing structure. Advantageously, such an adhesive can be applied to the sash and/or to one or more of the glazing panes directly in the form of a bead, such as a bead of sealant which can also function as the spacer element between the glazing panes. Alternatively, at least a portion of the adhesive can be co-extruded (or post-extruded) with the sash profile. Still further, the adhesive can comprise an integrated, single component desiccated sealant-adhesive glazing material. In a particularly advantageous embodiment, this material can be preformed into a variety of shapes and sizes, thereby providing, when applied to the sash profile and/or the glazing panes, an integrated sash/glazing assembly method.

It is noted that although the invention is described using glass panes, panes of other materials can be substituted. Such panes can comprise, for example, clear or frosted plastic, such as Plexiglas, tempered glass, safety glass, security glass, privacy glass, or any other known glazing material.

SUMMARY OF THE INVENTION

In accordance with the invention, a method is provided for fabricating an integrated multipane window sash. A sash frame is provided having a glazing pane installation opening accessible from a first side thereof and a glazing pane support surface on a second side thereof. A first glazing pane is inserted into the installation opening. An outside surface perimeter of the pane is placed adjacent to the support surface. A second glazing pane is inserted into the opening. An inside surface perimeter of the second pane is mounted adjacent to an inside surface perimeter of the first glazing pane. A glazing bead is installed along at least a portion of the glazing pane installation opening after the glazing panes have been inserted. It is noted that the glazing bead can comprise any type of suitable covering, such as a strip or frame formed from the same or similar material as the sash frame, a strip or frame formed from a different material than the sash frame, or a bead of adhesive, sealant, caulk, preformed or expanding adhesive foam, tape, or the like.

At least one additional glazing pane can be inserted into the opening and mounted adjacent to a previous glazing pane prior to installation of the glazing bead. In this manner, for example, a triple glazed unit can be manufactured. It should be appreciated that any number of glazing panes can be stacked within the sash frame in accordance with the invention, thereby providing the capability of manufacturing double pane, triple pane, quadruple pane, etc. windows.

The second pane can be mounted adjacent to the first pane via an adhesive, which may be applied, for example, to at least a portion of the inside surface perimeter of the first glazing pane. The adhesive can also (or alternatively) be applied to at least a portion of the inside surface perimeter of the second glazing pane. The adhesive can also (or alternatively) be applied to at least a portion of the sash frame. The adhesive can comprise any of a variety of different adhesive types and structures, such as a bead of adhesive (sometimes referred to as "sealant"), a preformed or expanding adhesive foam, a preformed adhesive tape, and/or a chemical sealant. Spacing clips can be provided as necessary to provide structure and/or maintain a constant spacing between the glazing panes.

In one embodiment, at least a portion of the outside surface perimeter of the first glazing pane is adhesively mounted to the support surface of the sash frame. Again, any suitable adhesive, including those described above, can be used. The support surface can comprise, for example, a lip which extends around the second side of said sash frame.

A desiccant can be provided between the first and second glazing panes. The desiccant can be either separate from the adhesive, or can be impregnated within the adhesive, i.e., a "desiccated adhesive."

In one embodiment, the glazing bead exerts pressure on the outside surface perimeter of the last glazing pane inserted into said glazing pane installation opening. The glazing bead thereby biases the glazing panes toward the support surface in order to facilitate the structural integrity of the unit and to hold the panes tightly within the sash. In an optional embodiment, setting blocks are provided adjacent to the support surface to facilitate positioning of at least one of the glazing panes within the sash frame.

The first glazing pane can be mounted to float on the support surface. Similarly, the second (and subsequent) glazing pane(s) can be mounted to float on the preceding glazing pane, such that the glazing panes function independently with respect to stresses.

The outside surface perimeter of the first glazing pane can be adhesively mounted to the support surface via an adhesive that is applied to at least a portion of the support surface by co-extrusion with a sash profile used to fabricate said sash frame. Alternatively, the outside surface perimeter of the first glazing pane can be adhesively mounted to the support surface via an adhesive that is applied to at least a portion of the support surface by extrusion after fabrication of said sash frame. In yet another embodiment, an adhesive is applied to at least a portion of the outside surface perimeter of the first glazing pane to adhesively mount the first glazing pane to the support surface.

In an embodiment where at least one of the glazing panes is mounted within the sash frame using an adhesive, edges of the pane can be at least partially embedded into the adhesive.

In order to provide an insulating glass structure, the second pane will usually be mounted adjacent to the first pane with a space therebetween. The space can be filled with an inert gas to improve the insulating quality of the unit, and sealed to prevent leakage of the gas therefrom.

In one illustrated embodiment, the second pane is mounted to the first pane via a spacer. The panes may be of the same or different (unequal) sizes. A cavity between the spacer and an inside perimeter of the sash frame can be filled with an adhesive. The cavity can be partially filled from the spacer toward the sash frame, without the adhesive contacting the inside perimeter. Alternatively, the cavity can be substantially completely filled from the spacer to the inside perimeter, with the adhesive contacting the inside perimeter. Edges of the glazing panes can be at least partially embedded in the adhesive.

In a further embodiment, a portion of the spacer is used as a setting block for at least one of the glazing panes. For example, the spacer can be substantially T-shaped, and can include a setting block portion.

At least one simulated muntin bar can be provided integral with the spacer. Alternatively, the spacer can be provided with a mounting element, such as a groove, for at least one simulated muntin bar or muntin bar assembly.

The spacer can, for example, comprise at least one of a bead of adhesive, a bead of desiccant, a preformed rigid material, a preformed or expanding foam, a preformed adhesive, and/or a preformed desiccant material.

The glazing bead can comprise, e.g., a flexible adhesive material, or a rigid strip that is attached to the sash frame.

In embodiments where an adhesive is provided between at least a portion of the outside surface perimeter of the first glazing pane and the support surface, a first dam leg can be provided between the support surface and an inside perimeter of the sash frame. The dam leg is intended to isolate the adhesive from the space between the first and second glazing panes, and more particularly from any adhesive or other material between the panes. A second dam leg can be provided in parallel with said first dam leg, such that the adhesive applied between the first pane and the support surface is constrained between the dam legs.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
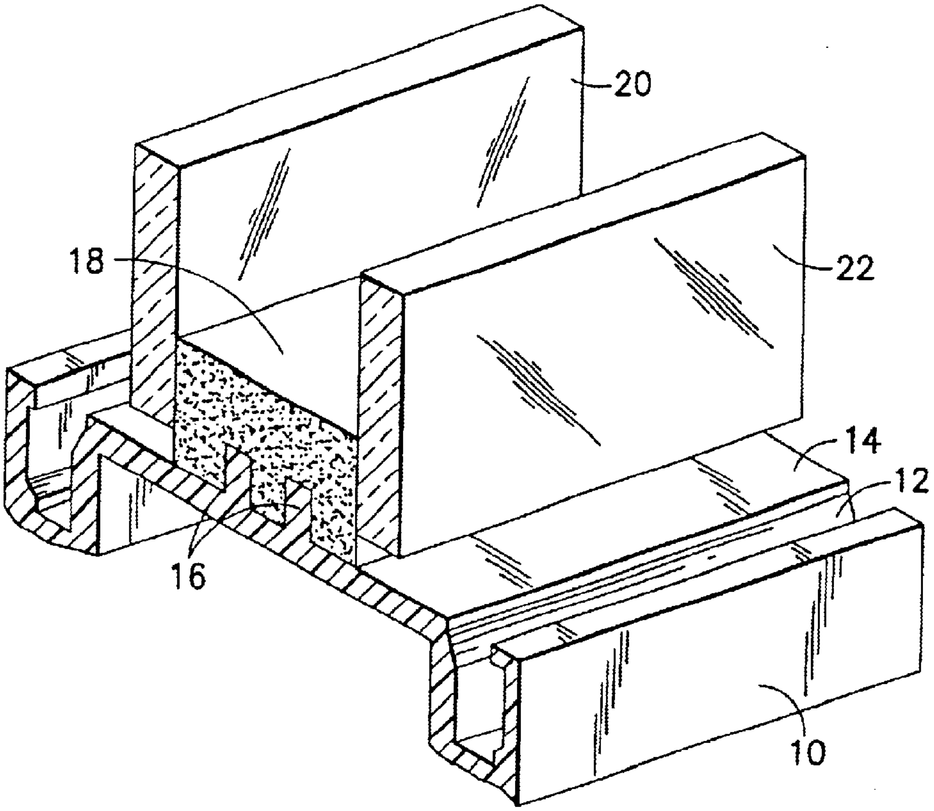
FIG. 1 is a perspective view showing a window sash profile portion with reinforcing ribs, the profile having insulating glass mounted thereto via an adhesive spacing and mounting structure.
Figure 2:
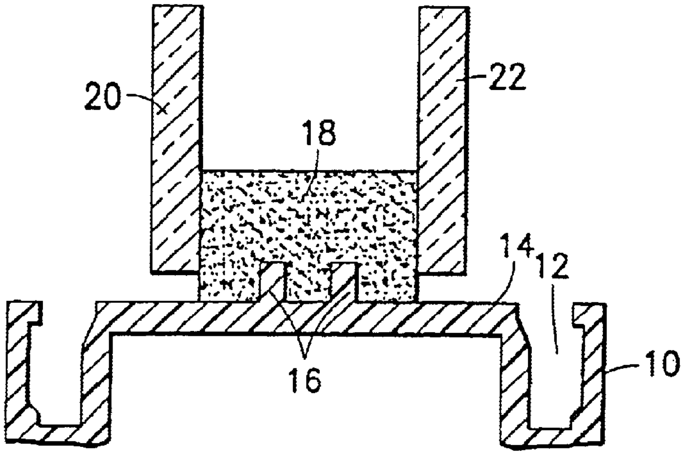
FIG. 2 is a front plan view of the embodiment of FIG. 1.
Figure 7:
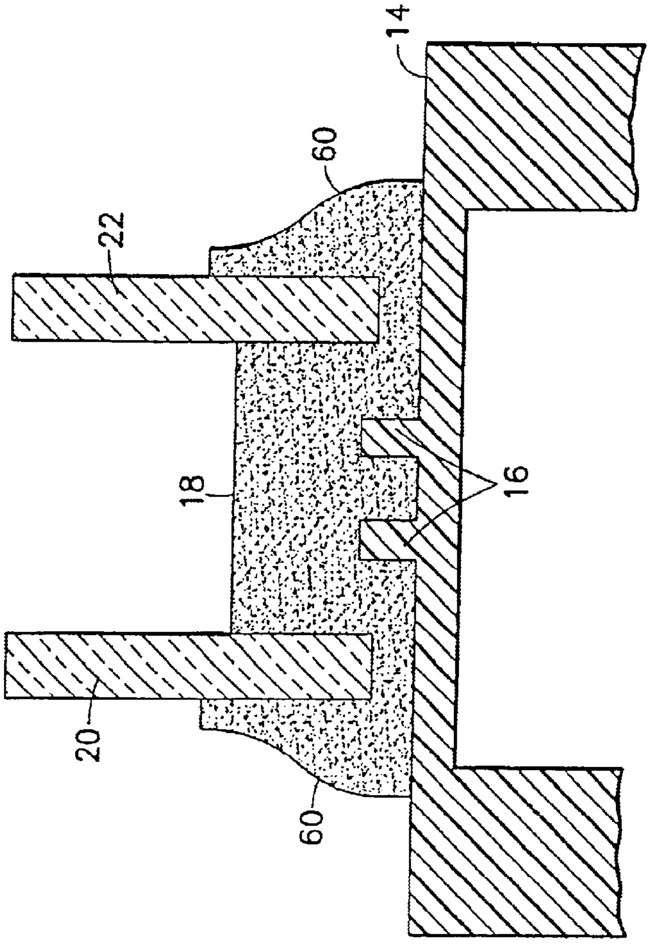
FIG. 7 is a cross-sectional view of an embodiment where the glazing panes are partially embedded in the adhesive spacing and mounting structure and an adhesive bead is used to replace a conventional glazing bead.

Referring now to FIGS. 1 and 2, a sash profile 10, which may be fabricated from vinyl, e.g., polyvinyl chloride (PVC) or any other material used for window frames, such as aluminum, wood, other plastics and the like, is provided for use in manufacturing an insulating glass window. The sash profile can be fabricated in any known manner, for example, by extrusion or injection molding. Although only a short section of the profile 10 is illustrated, it should be appreciated that the profile material will be provided in various lengths necessary to assemble a complete sash frame, which may be square, rectangular, oval, circular, or any other custom window shape as well known in the art. The illustrated profile 10 includes a channel 12 for retaining a glazing bead or clip (not shown) as well known in the art. As disclosed herein, the prior art glazing bead technology can be replaced with a glazing bead of adhesive sealant 60, as shown in FIG. 7, resulting in a dual sealed unit. For example, a bead of sealant can be applied adjacent to each glazing pane and the base 14 of the sash profile to cover the edges of the glass and define the viewing opening in an aesthetically pleasing manner. Preferably, the bead of adhesive sealant will match the sash profile in color. Alternatively a neutral color or translucent bead can be used. Moreover, the bead can be of any shape, such as the decorative shape illustrated in FIG. 7, a simple quarter round bead, or the like. Still further, it is desirable to have the top of the bead extend above the top of the adhesive spacing and mounting structure, so that the sides of the adhesive spacing and mounting structure will not be visible through the finished window. Various sealants, including silicone sealants, are suitable for use in forming the bead 60. Preferably, the material will be one that is and remains flexible, such that the glazing panes can float on the adhesive spacing and mounting structure without being locked in place by the bead 60, which may cause undesirable stresses to occur with thermal expansion and contraction, atmospheric pressure changes, and the like.

In an alternate embodiment, the sealant 60 can be one that dries substantially hard, having the appearance that it is part of the sash profile itself. In such an embodiment, the sealant does not have to make actual contact with the glass pane, but it would have to be in close proximity to the glass pane for aesthetic reasons. Obviously, if the sealant does not contact the glass, a double sealed unit will not result.

The glazing bead can alternatively comprise any other suitable material for covering the edges of the outermost glazing pane, resulting in a neat appearance for the completed integrated multipane sash assembly. Such materials include, without limitation, sealant, caulk, preformed or expanding adhesive foam, tape, and the like.

Sash profile 10 includes an inside perimeter portion 14 (sometimes referred to herein as the sash profile "base"), which, in the embodiment illustrated in FIGS. 1 and 2, includes ribs 16 extending therefrom. The ribs are provided to reinforce an adhesive spacing and mounting structure 18, which can comprise any of a plurality of different materials, such as foams, tapes, chemical sealants, silicone materials which may be cured, e.g., by heat, air, light, ultraviolet (UV) radiation, or the like, and/or other adhesive compounds designed to meet the necessary structural and sealing requirements of insulating glass windows. Where a preformed adhesive spacing and mounting structure 18 is used, such as a rigid, semi-rigid or flexible foam, grooves can be provided therein which mate with the ribs 16. Where a viscous substance (e.g., a chemical sealant) is used for the adhesive spacing and mounting structure, the substance is applied such that it conforms to and surrounds the ribs. Such application can be made, for example, by extruding along with the sash profile, by extruding after the profile is extruded, by application as a bead after extrusion of the profile, or by any other suitable manual or automatic (e.g., robotic) application technique. It should also be appreciated that the structure of the ribs 16 shown in FIGS. 1 and 2 is for purposes of illustration only, and any number of ribs having any suitable shape, such as a "J" or "L" shape, may be used for purposes of providing reinforcement to the adhesive spacing and mounting structure 18. The ribs can also function to guide a robotic arm or the like during application of the adhesive.

The surface of the base 14 of the sash profile and/or the surface of the ribs 16 can be roughened, if necessary, to provide an improved bond with the adhesive spacing and mounting structure. Other surface treatments can also be provided, e.g., during the sash profile extrusion process, to improve the ultimate bond with the adhesive material. For example, a bonding agent can be applied to the inside perimeter of the sash profile prior to application of the adhesive spacing and mounting structure.

The adhesive spacing and mounting structure is used to attach glass panes 20 and 22 to the sash profile 10. Although only two panes are illustrated in the Figures, it should be appreciated that the structures disclosed herein can be used with windows having three or more panes, as well. As can be seen, the spacing and mounting structure extends from the base 14 of the window sash, and will define a viewing perimeter smaller than the inside perimeter of the sash frame. The glass panes adhere to the structure 18 due to its adhesive nature, and when assembled in the sash frame in this manner, an insulating sash/glass structure results.

The adhesive spacing and mounting structure disclosed herein can have any shape that is suitable for mounting the glass panes to the sash profile. Thus, the substantially rectangular cross section of adhesive spacing and mounting structure 18 illustrated in FIG. 2 is an example only. The basic requirements for the adhesive spacing and mounting structure are that it has enough adhesive strength and structural rigidity to securely hold the glass panes onto the sash profile. Moreover, it must provide a hermetic seal for the space between the glass panes. It must also provide the desired spacing between the panes, which will be a function of how wide the adhesive spacing and mounting structure is when it is applied to the sash profile. The adhesive spacing and mounting structure should also be a thermal insulator, in order to avoid the problems of prior art metal spacer structures which result in windows that are prone to condensation at the viewing area edges. Still further, the adhesive spacing and mounting structure should include a desiccant, either combined therewith or provided, e.g., as a coating thereon.

Figure 3:
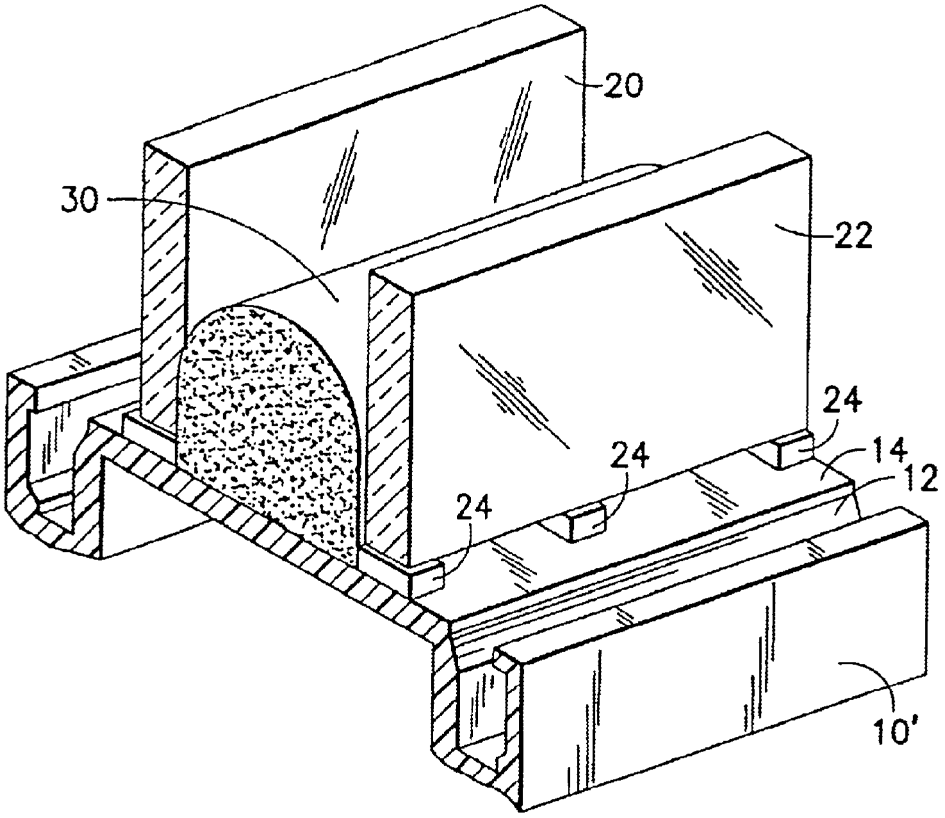
FIG. 3 is a perspective view showing a window sash profile portion without reinforcing ribs, the profile having insulating glass mounted thereto via an adhesive spacing and mounting structure.
Figure 4:
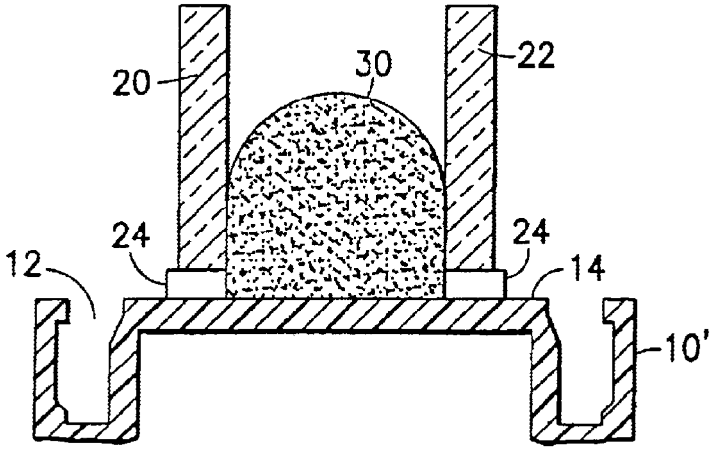
FIG. 4 is a front plan view of the embodiment of FIG. 3.

Another example shape for the adhesive spacing and mounting structure 18 is illustrated in FIGS. 3 and 4. In this example embodiment, the adhesive spacing and mounting structure has an inverted U-shape with respect to the base 14 of the sash profile 10'. It is noted that the example implementation shown in FIGS. 3 and 4 does not include ribs as part of the sash profile. However, ribs such as those shown in FIGS. 1 and 2 could be provided, if desired.

FIGS. 3 and 4 also illustrate the use of setting blocks 24. These blocks can be formed integrally with the sash profile 10', or can be separately attached to the base 14 of the sash profile. The purpose of the setting blocks is to provide a fixed stop for the glazing panes 20, 22. The setting blocks also function to raise the glazing panes away from the elements, such as water, moisture, or even incompatible sealants. The use of such setting blocks can also facilitate the automated placement and proper location of the glazing panes. As an alternative to the setting blocks, a continuous setting strip can be pre-extruded or post-extruded along with the sash profile. Where a setting strip is used, it is preferable to provide openings, such as holes, spaced along the strip in order to allow volatiles from the adhesive spacing and mounting structure and/or from the sash profile to escape (i.e., outgas), if necessary, and for sealant to cure.

Figure 5:
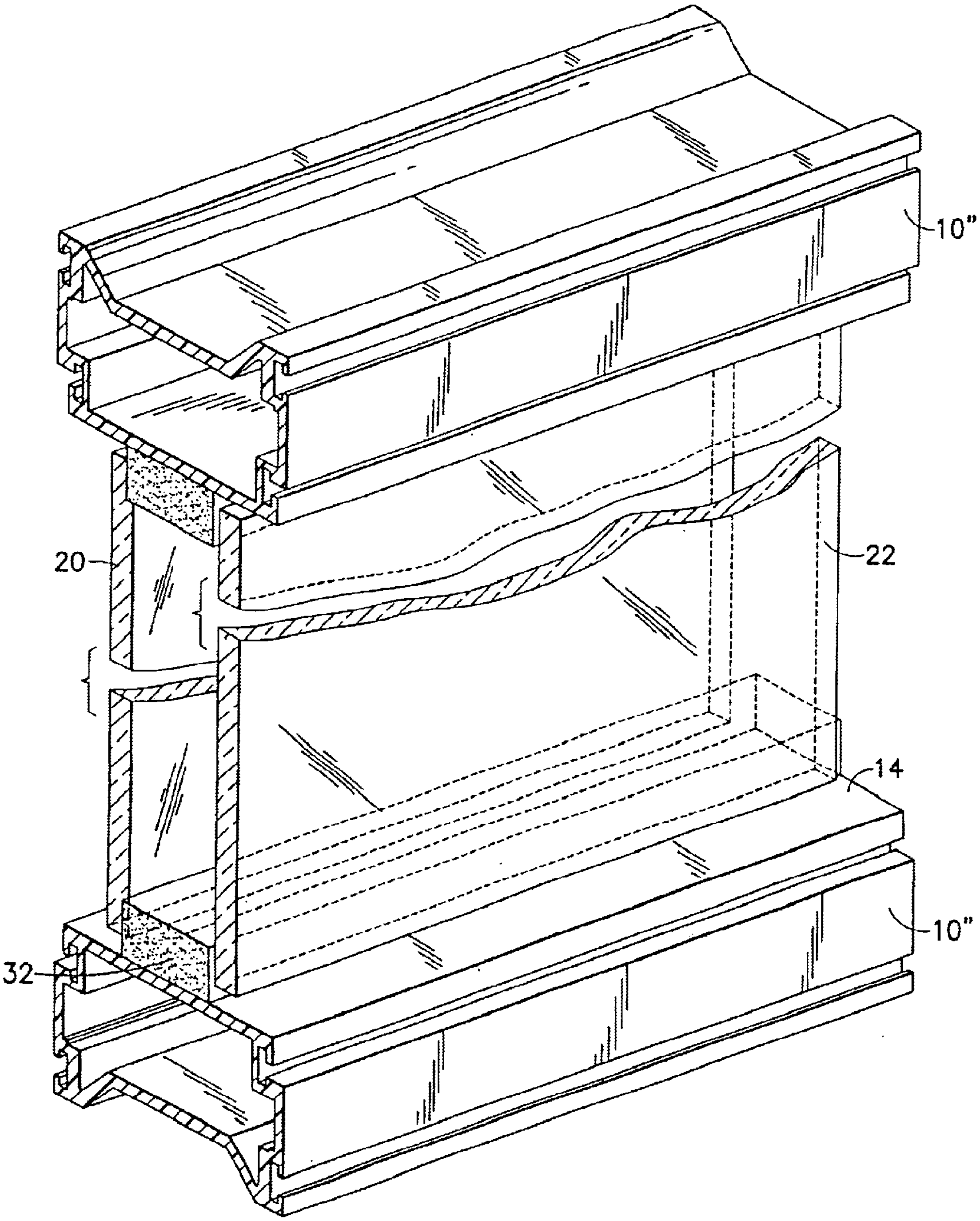
FIG. 5 is a perspective cross-sectional view of a portion of a window sash assembly.

FIG. 5 illustrates a portion of a completed sash assembly in accordance with the present disclosure. Although only horizontal sash profiles 10" are illustrated, it should be appreciated that the assembly will also have vertical sash profiles to complete the window opening. The adhesive spacing and mounting structure 32 illustrated in FIG. 5 has a rectangular cross-section, although as noted above, any suitable shape can be used, with or without setting blocks, a setting strip and/or ribs as described above. Moreover, the edges of glazing panes 22 could be embedded into the adhesive spacing and mounting structure 32, either fully or partially. Where the glazing panes are fully embedded into the adhesive spacing and mounting structure, setting blocks or strips will not be necessary, as the adhesive spacing and mounting structure itself will provide similar functionality.

Figure 6:
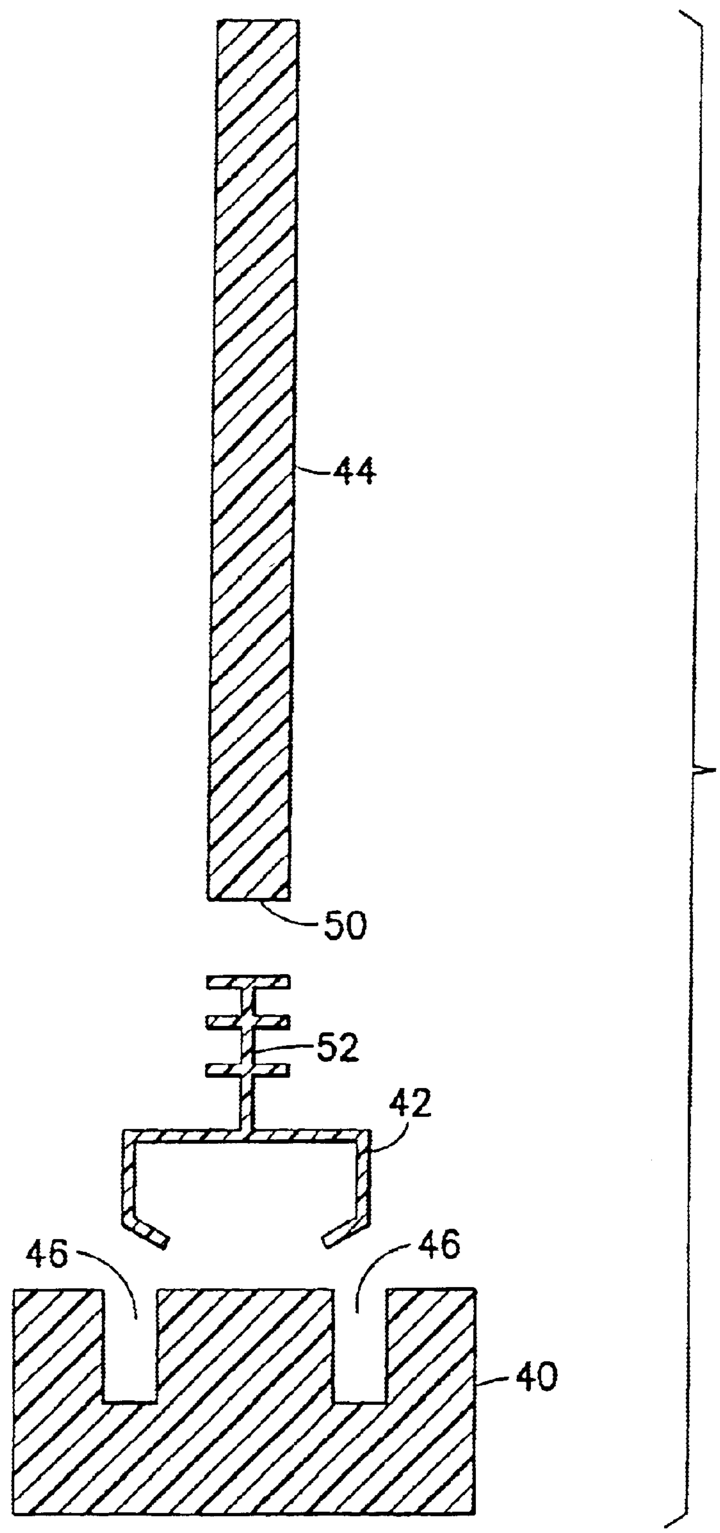
FIG. 6 is an exploded cross-sectional view of an adhesive spacing and mounting structure having channels for holding a muntin assembly.

FIG. 6 is an exploded cross sectional view of an adhesive spacing and mounting structure 40, which includes receptacles 46 for receiving a muntin clip 42. The muntin clip, in turn, receives a simulated muntin bar 44 which has a hollow (female) end 50 adapted to receive a male retaining portion 52 of clip 42. In this manner, the adhesive spacing and mounting structure can support a simulated muntin assembly between the glazing panes, providing, e.g., a window unit with a colonial appearance. Other size and shape clips can be used, together with corresponding receptacles at both the simulated muntin bar and the adhesive spacing and mounting structure. Moreover, the muntin bar could provide a male insert and the muntin clip could provide a female receptacle, instead of the opposite arrangement illustrated. Thus, the implementation illustrated in FIG. 6 is only an example showing how one or more muntin bars can be mounted between the glazing panes.

FIG. 7 illustrates an embodiment where the glazing panes 20, 22 are partially embedded in the adhesive spacing and mounting structure. As described above, either full or partial embedding can be provided. FIG. 7 also illustrates the adhesive bead 60 which, as described above, can be used instead of a conventional plastic or metal glazing bead. It is noted that the embedding and adhesive bead features illustrated in FIG. 7 are independent features, and do not have to be used together.

Figure 8:
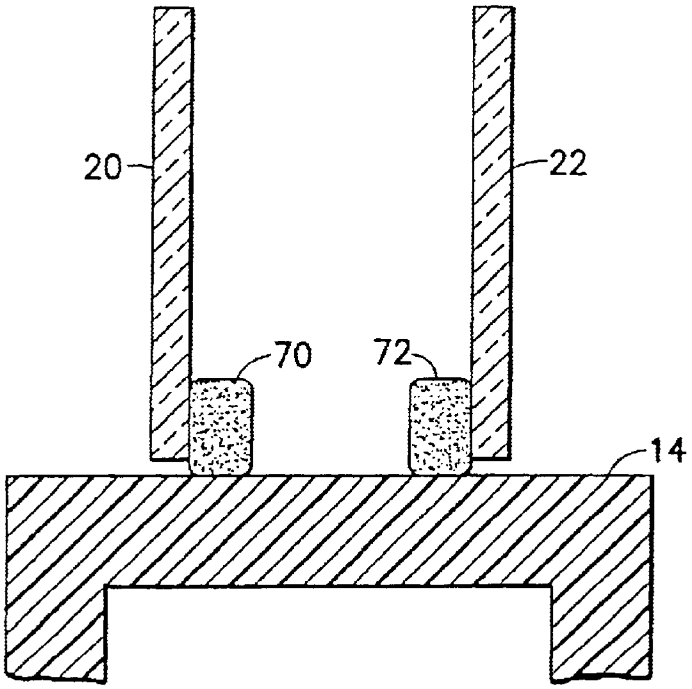
FIG. 8 is a cross-sectional view of an alternative embodiment wherein two separate adhesive mounting strips or beads are used instead of the adhesive spacing and mounting structure shown in FIGS. 1 to 7.

FIG. 8 illustrates an embodiment wherein each glazing pane 20, 22 is mounted to the base 14 of the sash using a separate bead or strip of adhesive. As shown, pane 20 is adhesively mounted via a first strip of adhesive material 70, and pane 22 is adhesively mounted via a second strip of adhesive material 72. The adhesive strips (e.g., beads) must be made from a material such as foam, tape, chemical sealants, silicone materials which may be cured, e.g., by heat, air, light, ultraviolet (UV) radiation, or the like, and/or other adhesive compounds designed to meet the necessary structural and sealing requirements of the window units.

Figure 9:
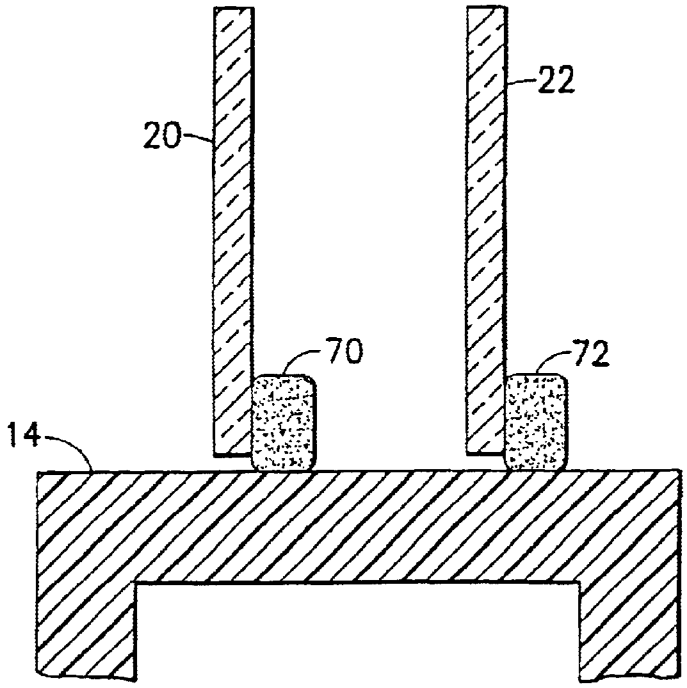
FIG. 9 is a cross-sectional view of another embodiment similar to that shown in FIG. 8, but wherein the glazing panes are mounted on opposite sides.

FIG. 9 is an embodiment similar to that shown in FIG. 8. However, in FIG. 9, the inside surface of glazing pane 20 is mounted to adhesive mounting structure 70, whereas the outside surface of glazing pane 22 is mounted to adhesive mounting structure 72.

Figure 10:
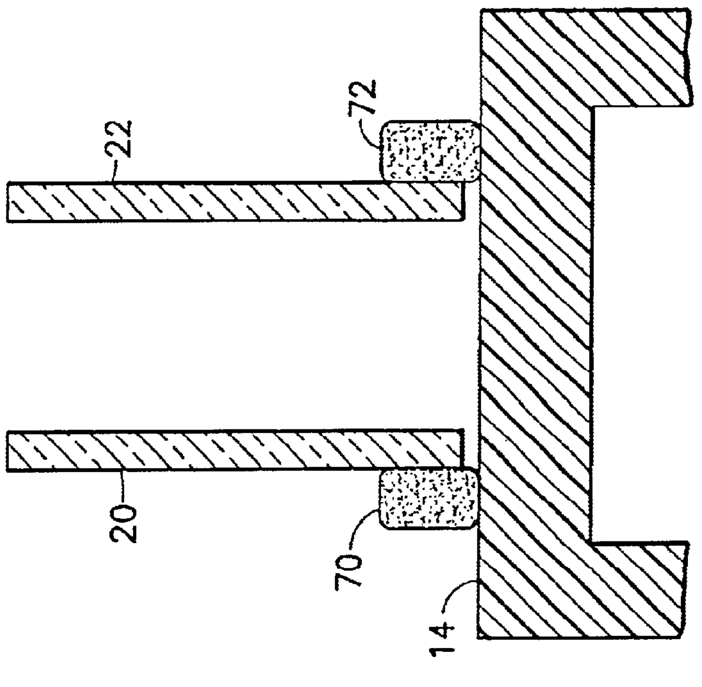
FIG. 10 is a cross-sectional view of another embodiment similar to that shown in FIGS. 8 and 9, but wherein the glazing panes are both mounted via outside surfaces thereof.

FIG. 10 is an embodiment similar to that shown in FIGS. 8 and 9. However, in FIG. 10, the outside surfaces of both glazing panes 20 and 22 are mounted to their respective adhesive mounting structures 70, 72.

The alternative structures and materials discussed in connection with the embodiments of FIGS. 1 to 7 are also applicable to the embodiments of FIGS. 8 to 10. Thus, for example, ribs (such as ribs 16 shown in FIGS. 1 and 2) and glazing blocks or strips (as shown in FIGS. 3 and 4) can be provided in the embodiments of FIGS. 8 to 10, as well as in any of the other embodiments illustrated. A bead of adhesive sealant 60 as described in connection with FIG. 7 can also be provided in any of the embodiments disclosed herein.

In accordance with the present disclosure, any number of glazing panes can be mounted to a sash frame. For example, a triple glazed unit can be fabricated using one adhesive mounting and spacing structure for two panes, mounted, e.g., as shown in FIGS. 3 and 4, with the third pane mounted to a separate adhesive bead as illustrated in FIG. 8 or 9. Alternatively, separate adhesive beads can be used to mount all three (or more) panes to the sash. Moreover, as is evident from FIGS. 8, 9 and 10, the panes can be mounted on either side thereof.

In FIGS. 8 to 10, the edges of the glazing panes contact their respective adhesive strips, but are not embedded in the adhesive. It should be appreciated, however, that the panes could also be partially or completely embedded in the strips, as discussed in connection with FIG. 7. In order to desiccate the space between the glazing panes in the embodiments of FIGS. 8 and 9, a separate desiccant can be placed in the space between the adhesive strips 70, 72 (FIG. 8), in the space between adhesive strip 70 and glazing pane 22 (FIG. 9), or the adhesive material used to form the strips can be impregnated with a desiccant material. In the latter case, only adhesive strip 70 would have to be desiccated in the embodiment of FIG. 9, unless a third glazing pane is provided in a manner that would result in strip 72 being sealed between respective panes. In the embodiment of FIG. 10, the desiccant would be placed in the space between the glazing panes 20, 22.

In the preferred embodiments, the adhesive strips of FIGS. 8 to 10 will have enough structural support to maintain a consistent desired spacing between the substantially parallel glazing panes. However, where this is not the case, intermittent spacing bars, tabs or similar spacer structures can be integrally formed on or mounted to the base 14 of the sash profile, in order to maintain the proper spacing.

Figure 11:
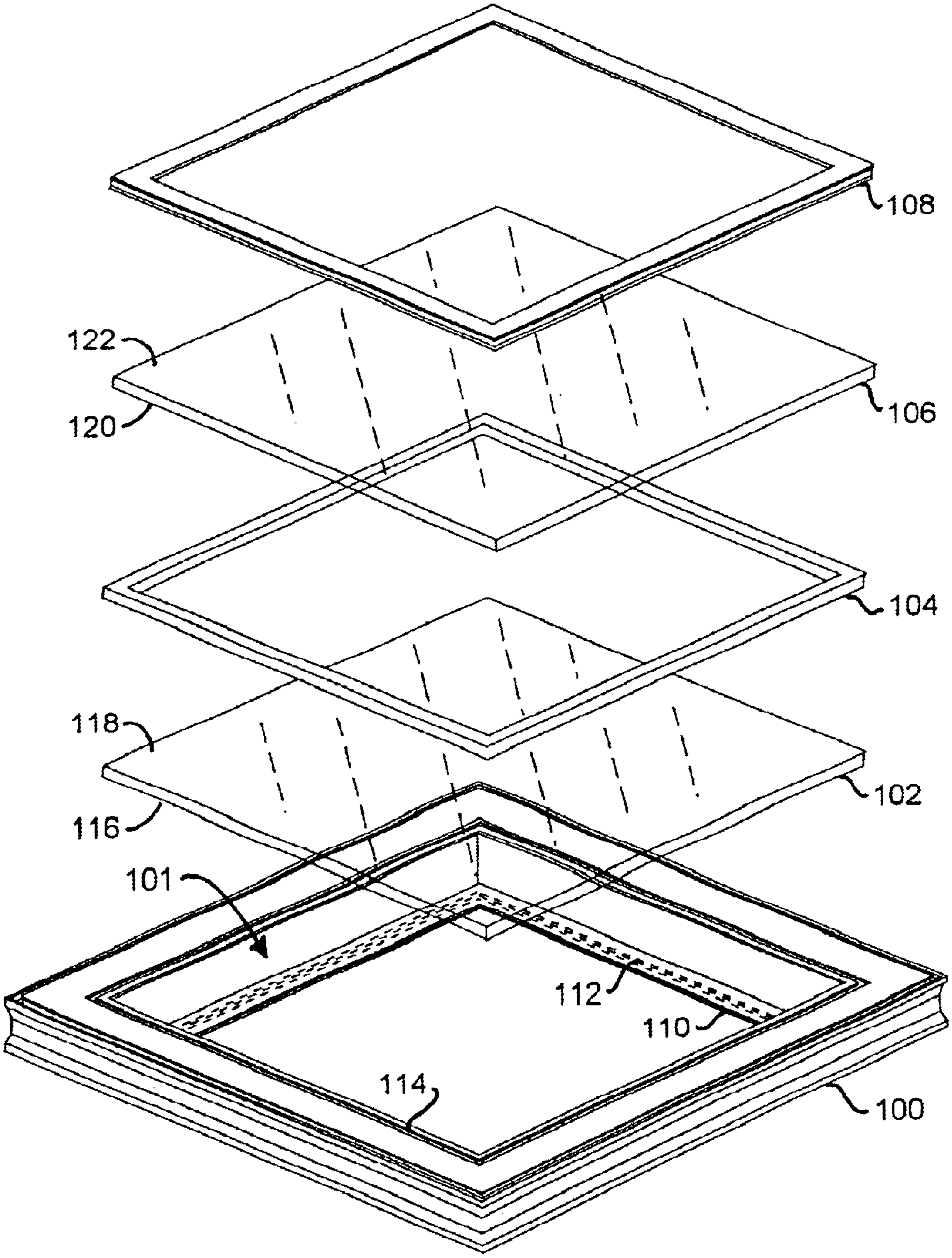
FIG. 11 is an exploded view showing the assembly of an integrated multipane window unit and sash in accordance with the invention.

FIG. 11 is an exploded perspective view that illustrates the fabrication of an integrated multipane window sash in accordance with the present invention. Although a horizontally oriented fabrication is shown for purposes of explanation, it should be appreciated that a vertically oriented fabrication can also be implemented, although the horizontal fabrication lends itself to an easier assembly.

As indicated in FIG. 11, the method of the invention starts out with a sash frame 100 which includes a glazing pane installation opening 101 that is accessible from a first side of the sash frame. A glazing pane support surface 110 is provided on a second side of the sash frame 100. An integrated multipane sash assembly is assembled by inserting a first glazing pane 102 into the installation opening 101. An outside surface perimeter 116 of the glazing pane 102 is placed adjacent to the support surface 110. An optional layer 112, which can comprise sealant, adhesive tape, adhesive foam, a bulb seal, a gasket (e.g., butyl tape, foam, weatherstripping, etc.), or the like, can be provided between the glazing pane perimeter and the support surface 110. The use of such an adhesive can provide additional structural integrity to the completed unit. The layer 112 can also, or alternatively, provide a cushioning surface for the edges of the glazing pane 102.

After the first glazing pane is installed, a second glazing pane 106 is mounted adjacent to the first glazing pane. This can be accomplished, for example, by providing an adhesive, such as a preformed adhesive 104, between the respective glass panes. More particularly, a preformed adhesive bead, tape, foam (preformed or expanding) or the like can be applied to the inside surface perimeter 118 of the first glazing pane. Alternatively, the adhesive 104 can be applied to the inside surface perimeter 120 of the second glazing pane 106, or the adhesive can be applied to the inside perimeter of the sash frame 100. Regardless of how the adhesive is applied, the goal is to position it such that it will join the glazing panes 102, 106 along their respective inside perimeter surfaces 118, 120, with a space therebetween. The space is intended to enclose air or an inert gas for insulating purposes, as well known in the insulating glass art.

Although only two glazing panes are illustrated in FIG. 11, it should be appreciated that any number of such panes can be provided in accordance with the invention. Generally, double and triple pane insulating glass products are provided in the market. However, there is no reason that quadruple pane and higher cannot be provided in accordance with the present invention. An example of a triple pane embodiment is shown in FIG. 13.

Figure 17:
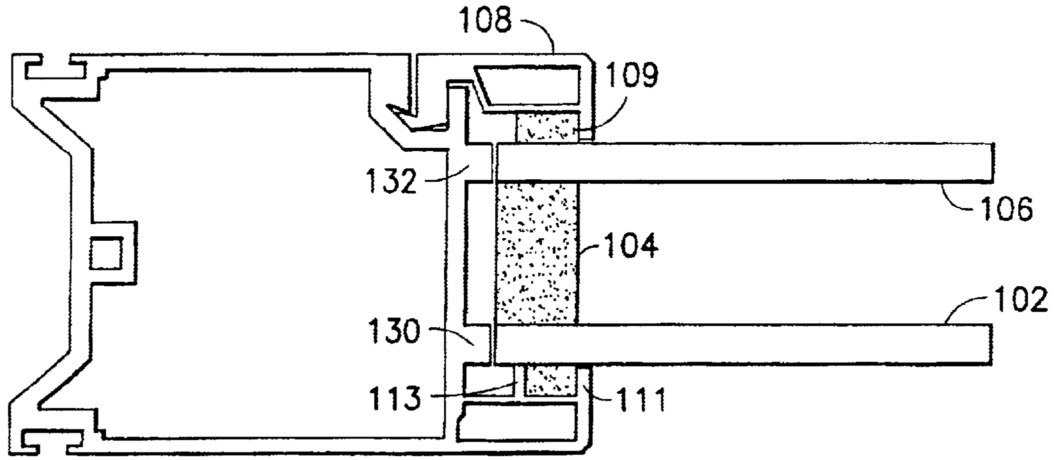
FIG. 17 is a cross-sectional view of an embodiment incorporating an adhesive layer or gasket between the glazing bead and the adjacent glazing pane, as well as integral setting blocks.

After all of the desired glazing panes have been inserted into the sash frame, a glazing bead 108 is installed along at least a portion of the glazing pane installation opening 101. In the embodiment of FIG. 11, the glazing bead 108 is a prefabricated component that is designed to snap into a receptacle 114 of the sash frame. The glazing bead 108 can be designed to provide additional structural support by biasing the assembly of glazing panes against the support surface 110. The glazing bead also serves to cover the edges of the glazing panes as well as the adhesive (which would otherwise be visible through the panes)for aesthetic purposes. As indicated in FIG. 17, an adhesive 109 can be applied between the glazing pane 106 and the glazing bead 108.

Figure 12:
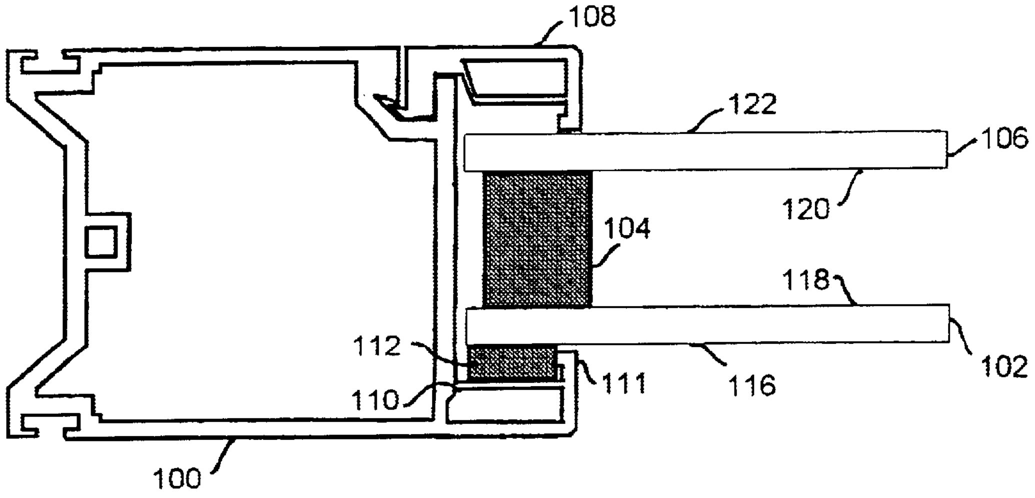
FIG. 12 is a cross-sectional view of an integrated multipane window unit and sash assembly fabricated in accordance with the invention.
Figure 13:
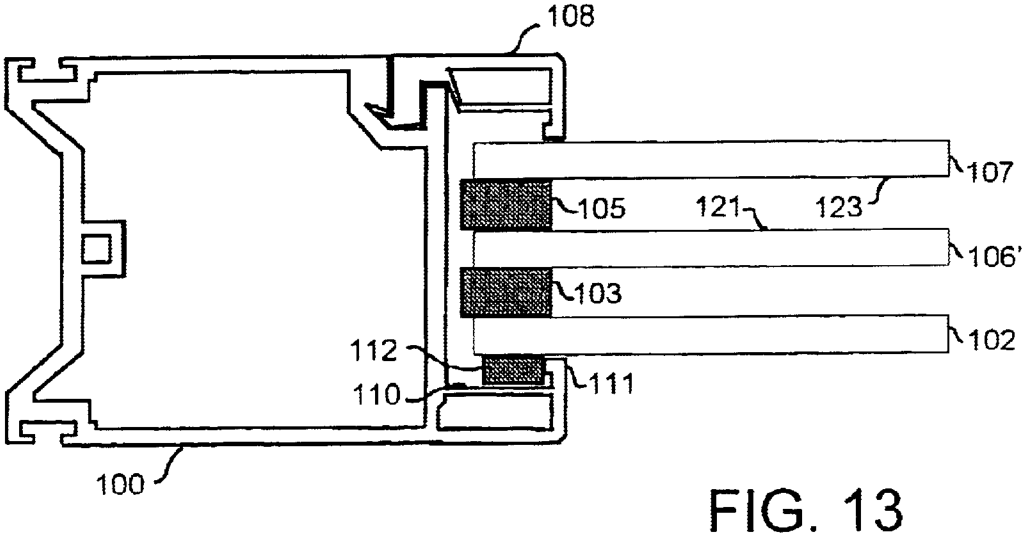
FIG. 13 is a cross-sectional view of an integrated triple pane window unit and sash assembly fabricated in accordance with the invention.

FIGS. 12 and 13 show cross sectional views of integrated multipane window sashes fabricated in accordance with the technique illustrated in FIG. 11. As shown in these figures, the support surface 110 of the sash frame 100 can be provided with a leg (sometimes referred to as a "dam leg") 111, which provides a recess for the optional layer 112. In the event layer 112 comprises a material having low viscosity (such as traditional silicone known in the glazing industry), the dam leg 111 will prevent runoff of the material when it is applied. Typically, the glazing pane 102 will be in contact with the top of leg 111. It should be appreciated, however, that if the layer 112 comprises a structural material, such as a type of foam, viscous adhesive or sealant, or a semi-rigid layer, the layer 112 can provide sufficient support to the glazing pane such that the pane will not come into contact with the leg 111.

In the triple pane embodiment of FIG. 13, a third glazing pane 107 is mounted adjacent to the second glazing pane 106'. In the illustrated embodiment, the inside surface perimeters of panes 102 and 106' are joined via adhesive 103. The inside surface perimeter 123 of pane 107 is joined to the facing (also inside) surface 121 of pane 106'. It should be appreciated that since glazing pane 106' is situated between panes 102 and 107, both surfaces thereof can be regarded as "inside" surfaces.

Figure 14:
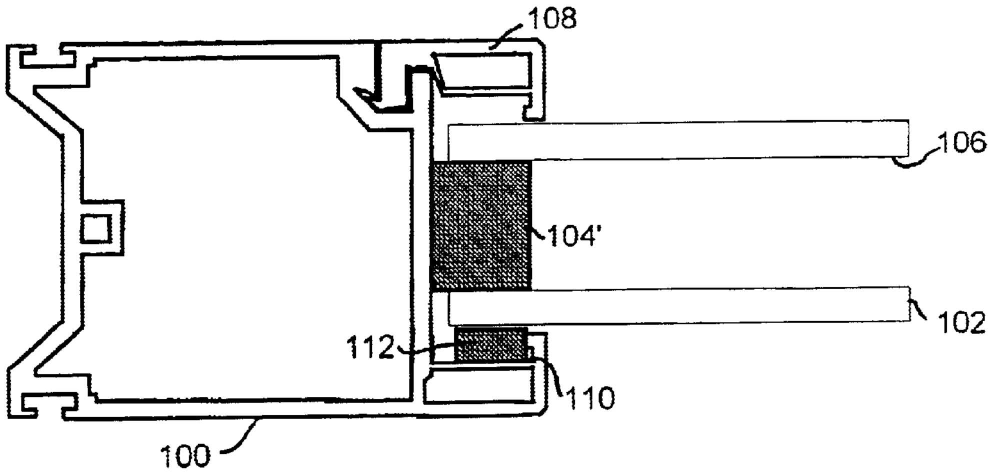
FIG. 14 is a cross-sectional view of an embodiment of an integrated multipane window unit and sash assembly fabricated in accordance with the invention, in which adhesive between the glazing panes also contacts the sash frame.

FIG. 14 illustrates an embodiment similar to that shown in FIG. 12, but wherein the adhesive 104' extends beyond the edges of the glazing panes to contact a portion of the sash frame 100. Such an embodiment can be fabricated, for example, by applying the adhesive 104' to the inside surface 118 of glazing pane 102 in a manner that overlaps the edge and contacts the sash frame. For example, the adhesive can comprise a bead of sealant or the like, or an adhesive tape or foam, that is applied to both the glazing pane and the sash frame in a single operation. Additional structural integrity is provided by applying the adhesive layer(s)to both the glazing panes and the sash frame.

Figure 15:
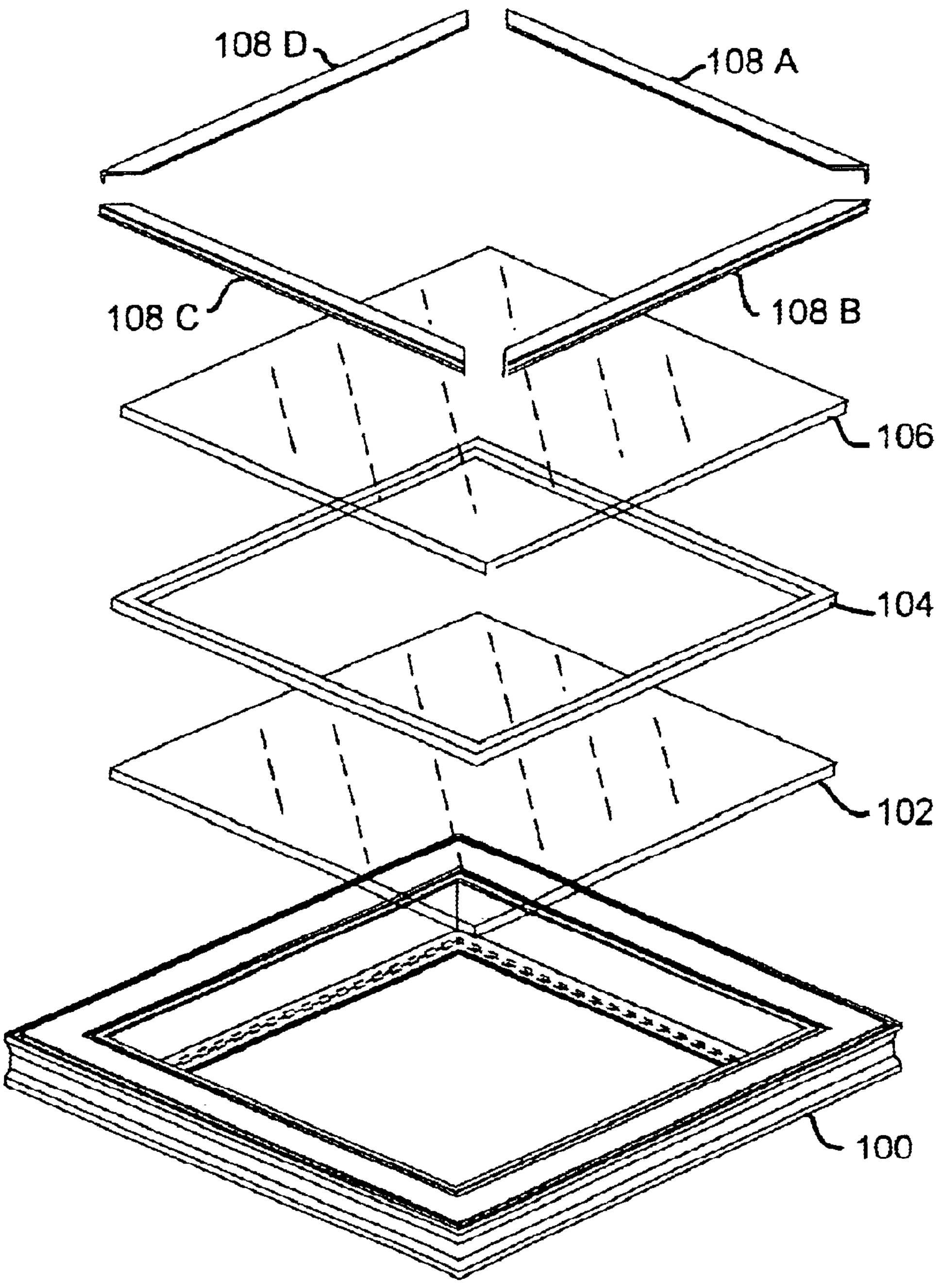
FIG. 15 is an exploded view similar to FIG. 11, but in which separate glazing beads are used for each side of the sash.

FIG. 15 illustrates an embodiment similar to that of FIG. 11, except that separate glazing beads 108A, 108B, 108C and 108D are provided for each side of the sash frame. These glazing beads can be mounted to the sash frame in any suitable manner, such as via a snap fit, sliding fit, adhesive mount, welding operation, or the like.

Figure 16:
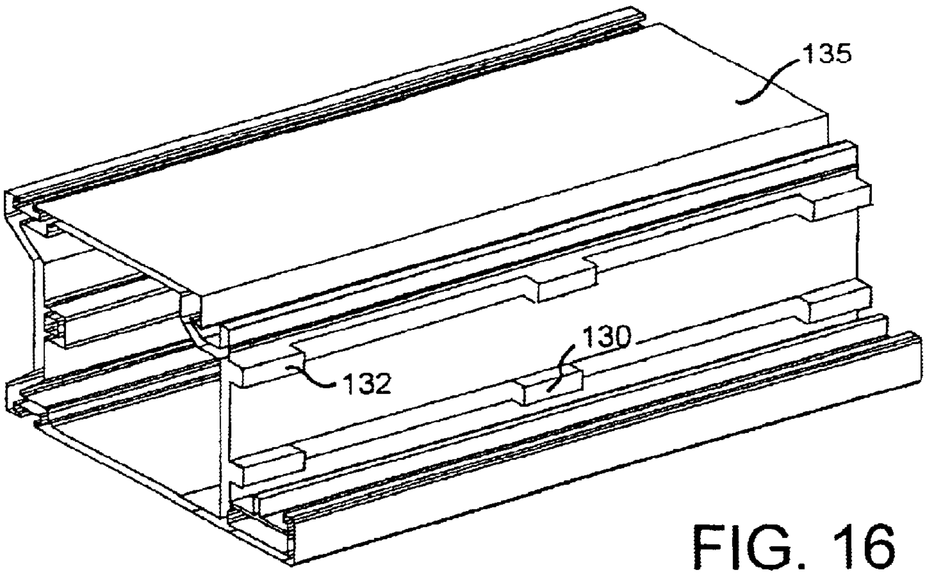
FIG. 16 is a perspective view of a portion of a sash profile in which integral setting blocks are provided for edges of the glazing panes.

FIG. 16 illustrates a portion of a sash profile 135 that can be used to fabricate the sash frame 100, in which integral setting blocks 130 and 132 are provided. The setting blocks can, for example, be injection molded together with the sash frame, can be machined into the sash frame by milling or cutting, or can be manufactured in any other known manner, such as by gluing or welding separate pieces to the sash profile. As illustrated in FIG. 17, the glazing panes 102 and 106 are installed such that their edges abut the respective setting blocks 130, 132. It is noted that if setting blocks are not provided, the edges of the glazing panes may directly contact the inside perimeter of the sash frame, instead of being spaced away from the sash frame as illustrated in the drawings.

FIG. 17 also illustrates variations of the dam leg 111 discussed above in connection with FIGS. 12 and 13. For example, although the leg 111 is illustrated in other Figures with a return 115 (as shown, e.g., in FIG. 18), the return is optional and the leg can simply terminate with a straight edge as shown in FIG. 17.

As also illustrated in FIG. 17, an additional leg 113 can be provided to isolate the layer 112 from the adhesive that resides between the glazing panes. Such isolation would be desirable, for example, if the materials used for the adhesive 104 and the layer 112 were incompatible (e.g., chemically reactive with one another). Leg 113 has the additional advantage that it can be used to define a fixed space in which to apply the layer 112. Moreover, leg 113 can optionally be extended to be higher than leg 111, such that the extended portion will function as a setting block for the glazing pane 102, in which case setting blocks 130 will not be required. It is noted that legs 111, 113 can be rigid or flexible, depending on the requirements of the specific application. If layer 112 is not provided, the legs 111 and/or 113 can be eliminated.

Figure 18:
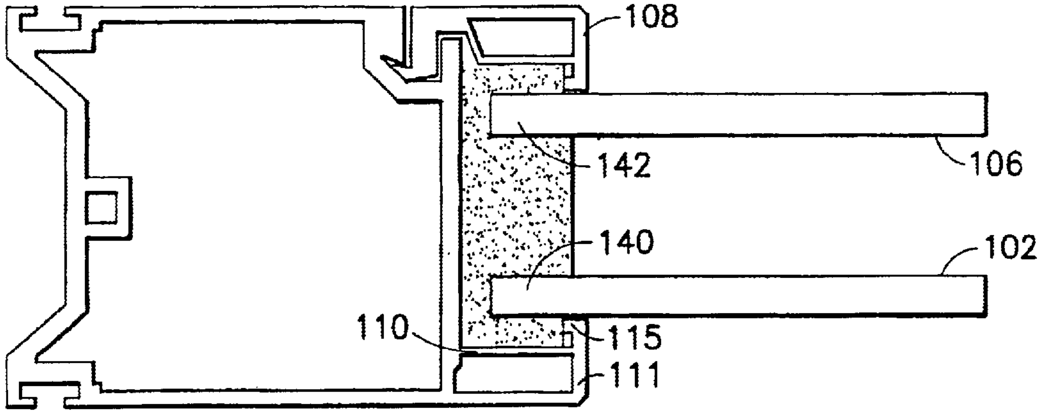
FIG. 18 is a cross-sectional view of an embodiment in which edges of the glazing panes are completely embedded in adhesive.

FIG. 18 illustrates yet another embodiment wherein no internal dam leg (such as leg 113 in FIG. 17) is provided and the adhesives used have a low enough viscosity to migrate around the edges of the glazing panes and merge together, substantially filling the space between the support surface 110 and the glazing bead 108. In this structure, the glazing pane edges 140, 142 are embedded into the adhesive(s) used.

Figure 19:
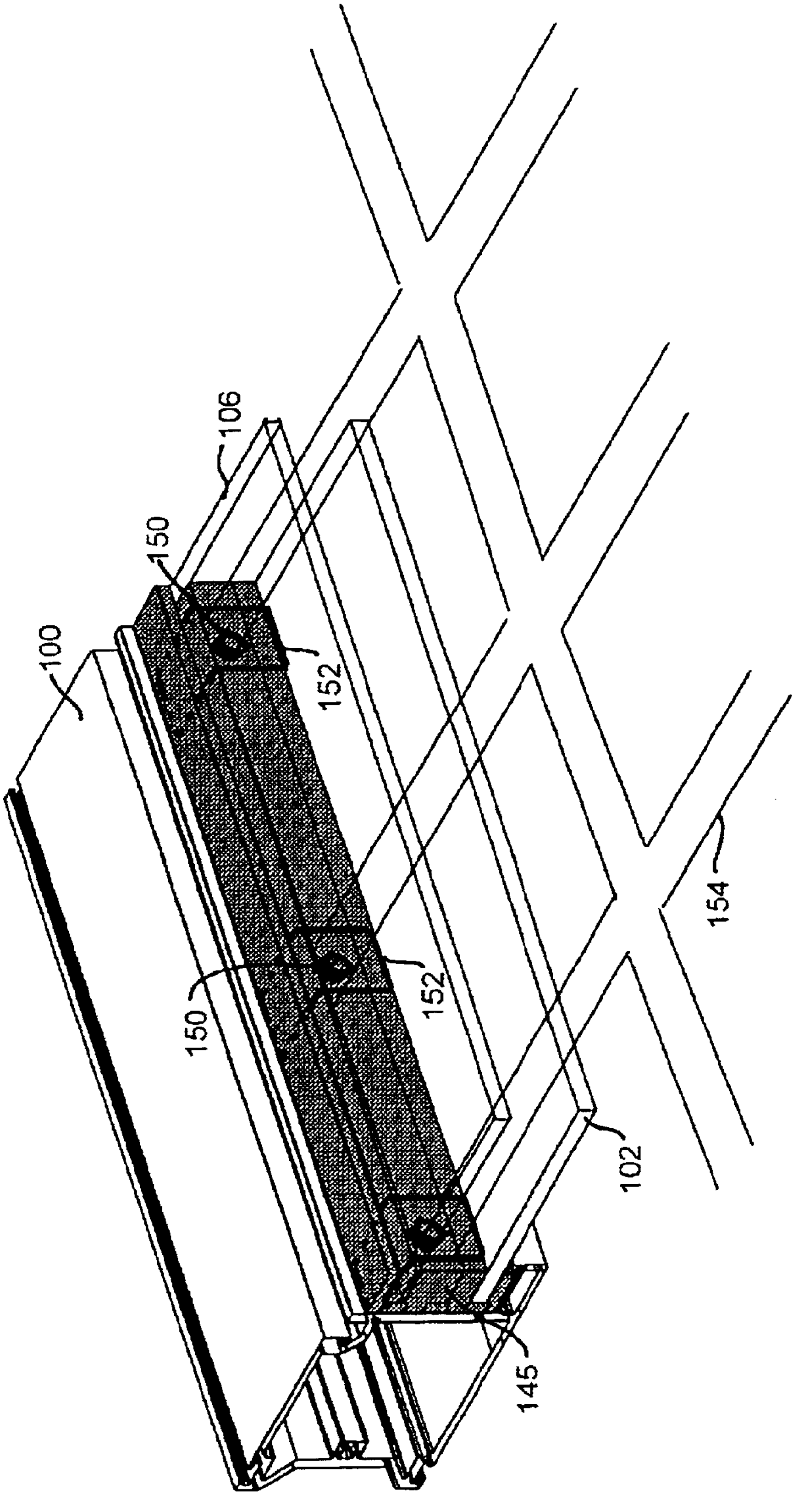
FIG. 19 is a partial perspective view illustrating spacer clips which also function as simulated muntin bar mounts in accordance with the invention.

FIG. 19 is a perspective view that illustrates the use of spacer clips 150 that can be placed between the glazing panes 102, 106. In the embodiment shown, the spacer clips are L-shaped, such that they can be laid onto the adhesive 145 before the second glazing pane 106 is installed. The spacer clips can alternatively be of any other suitable shape, such as a U-shape or box shape, or can be implemented as corner clips. The spacer clips are intended to maintain a desired spacing between the inside surfaces of the glazing panes, and/or to hold the panes apart while the adhesive therebetween sets or cures.

Optionally, the spacer clips 150 can be used to secure a simulated muntin bar or grid 154 between the glazing panes. In this event, the clips 150 and the muntin bar(s) or grid 154 will have mating portions, such as an opening 152 in the spacer clip that receives a corresponding pin that extends from the muntin bar or grid. The mating portions can take any other suitable form, such as slots and pins, resilient clips, or the like.

FIGS. 20A to 20F illustrate the assembly of a slightly different embodiment of an integrated multipane window sash in accordance with the invention. In this embodiment, at least a portion of the adhesive is not applied until after the glazing panes are placed into position. Moreover, this embodiment lends itself to the use of different size glazing panes.

Figure 20A:
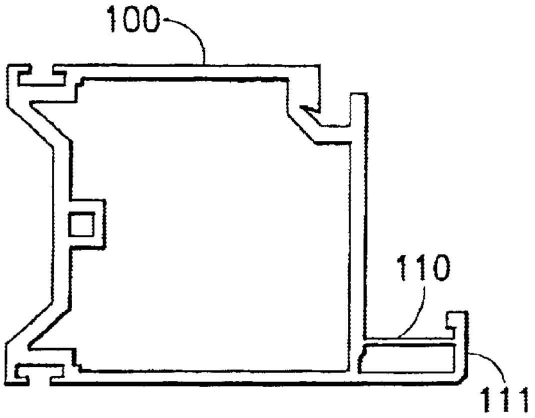
FIGS. 20A to 20F illustrate the assembly of an integrated multipane window sash in accordance with an alternative embodiment of the invention.
Figure 20B:
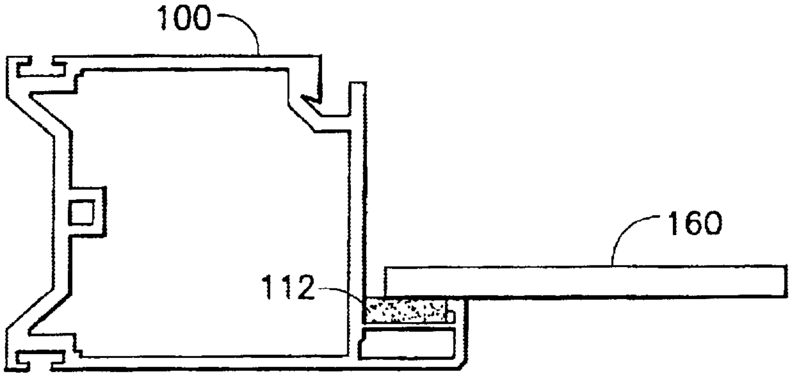

As illustrated in FIG. 20A, the assembly starts out with the sash frame 100, which includes a support surface 110 and optionally, a dam leg 111, as discussed above. In FIG. 20B, a first glazing pane 160 is placed adjacent to the support surface 110. An optional layer 112 can be provided on the support surface 110. As discussed above, the layer 112 can comprise, for example, a gasket or adhesive (e.g., sealant).

Figure 20C:
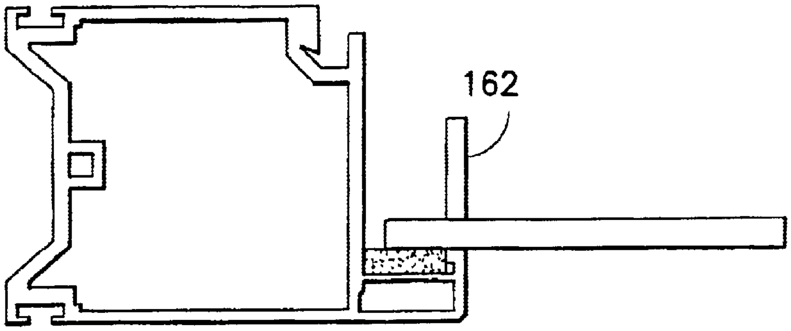

After the first glazing pane 160 has been installed into the sash frame, a spacer 162 is placed on the first glazing pane, e.g., along its inside surface perimeter, as shown in FIG. 20C. The spacer 162 can comprise, for example, a foam spacer with or without a separate glazing support. For example, a laminated spacer comprising foam and supporting metal (e.g., aluminum) layers can be used. Other types of spacers are also suitable, such as metal, plastic, rigid tape, adhesive layers and combinations thereof, etc. as discussed hereinabove. The spacer can also include a desiccant.

Figure 20D:
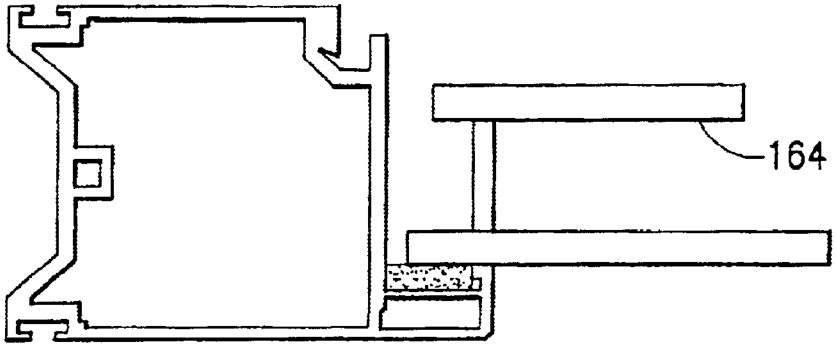
Figure 20E:
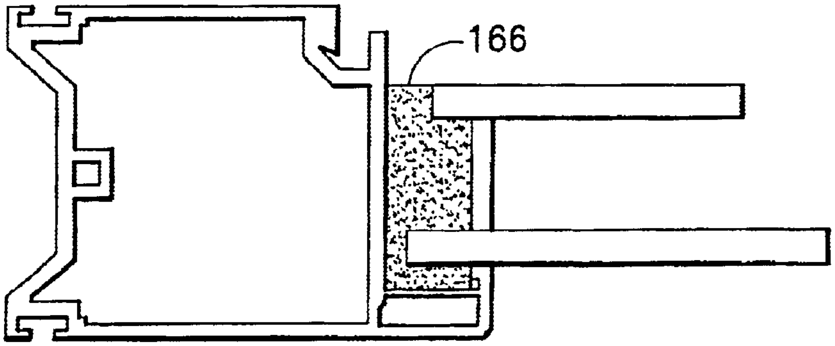
Figure 20F:
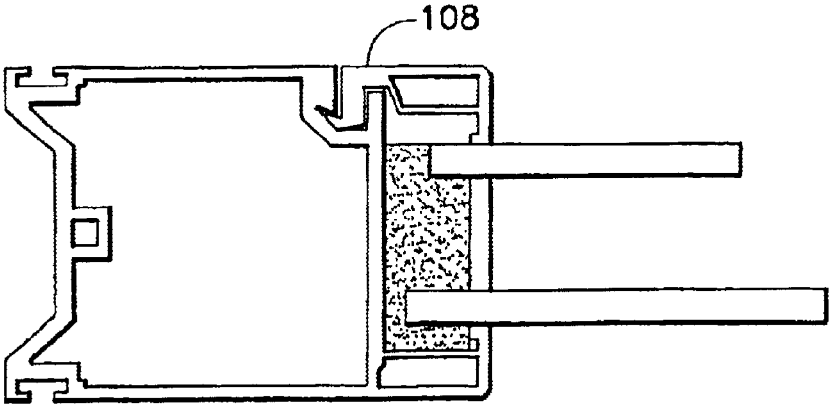
Figure 28:
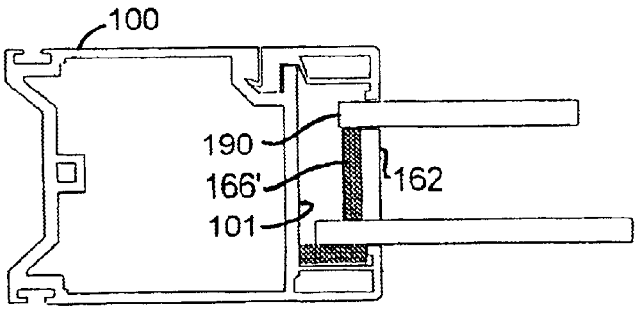
FIG. 28 is a cross-sectional view of an embodiment where the adhesive between the glazing panes does not extend to the inside perimeter of the sash frame.

After the spacer 162 is provided, a second glazing pane 164 is set on top of the spacer, as indicated in FIG. 20D. The second glazing pane can be equal in size to the first glazing pane, or it can be of unequal size (e.g., smaller) as shown in the figure. A smaller size will facilitate the subsequent application of adhesive, as illustrated in FIG. 20E, where sealant (or other adhesive) 166 is provided to back-fill the glazing panes and spacer. For example, the sealant or other adhesive 166 can be pumped into the cavity between the sash frame 100 and the spacer 162 via a nozzle, which may, e.g., be robotically controlled. Manual application is also possible. After the adhesive is injected into the cavity (or otherwise applied) as shown in FIG. 20E, the glazing bead 108 is installed as shown in FIG. 20F. It is noted that although the adhesive 166 illustrated in FIGS. 20E and 20F extends all the way from the spacer 162 to the inside perimeter of the sash frame 100 (thereby completely filling the cavity), this does not have to be the case. The adhesive can instead extend from the spacer to any point between the spacer and the sash frame, e.g., from the spacer to the edge of glazing pane 164 or from the spacer to the edge of glazing pane 160. An embodiment where the adhesive 166' extends from spacer 162 to the edge 190 of the upper pane, instead of all the way to the inside perimeter 101 of sash frame 100, is illustrated in FIG. 28.

Figure 21:
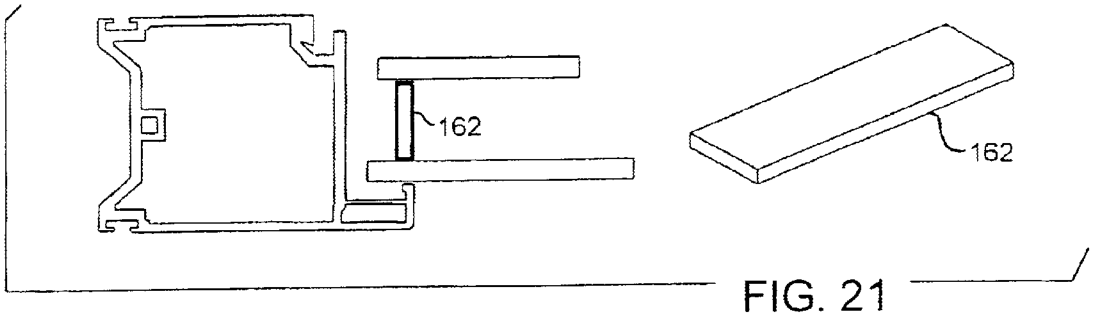
FIG. 21 illustrates a flat spacer that can be used in the embodiment of FIGS. 20A to 20F.
Figure 22:
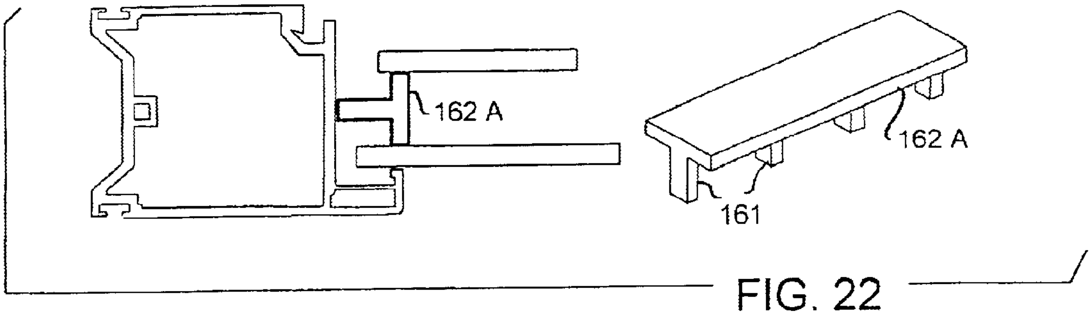
FIG. 22 illustrates a T-shaped spacer that can be used in the embodiment of FIGS. 20A to 20F.
Figure 23:
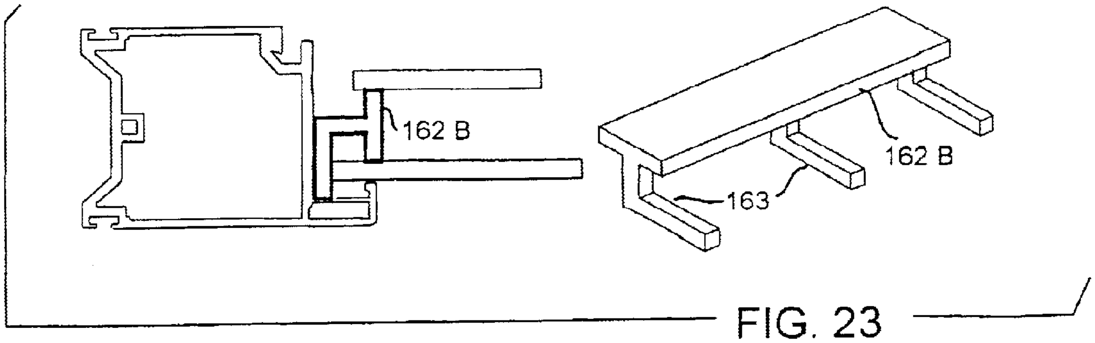
FIG. 23 illustrates a T-shaped spacer with extension legs that can be used in the embodiment of FIGS. 20A to 20F.
Figure 24:
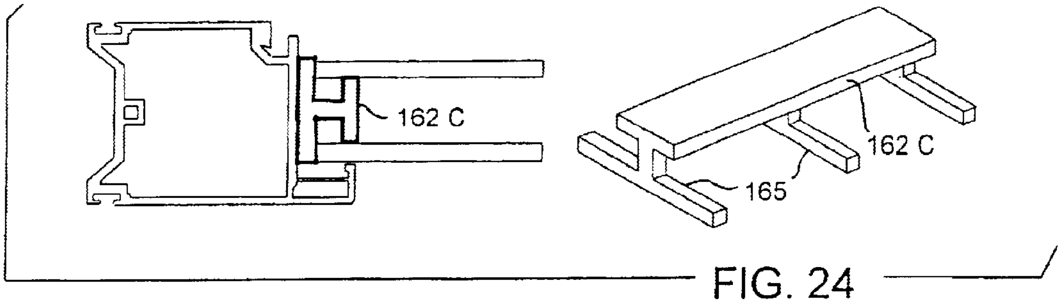
FIG. 24 illustrates a T-shaped spacer with double extension legs that can be used in the embodiment of FIGS. 20A to 20F.
Figure 25:
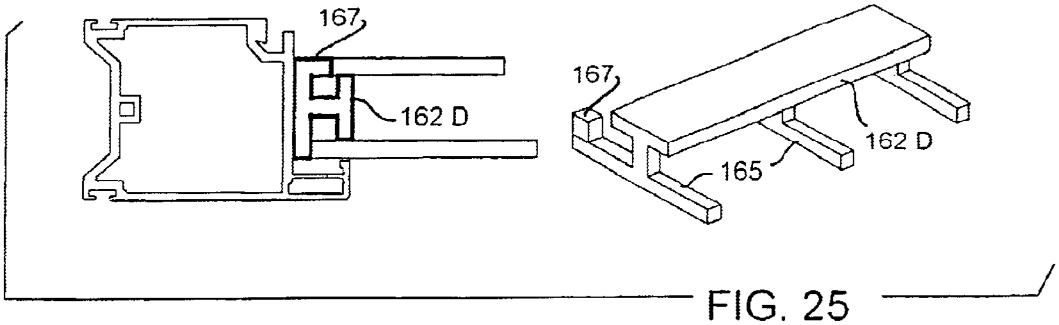
FIG. 25 illustrates a T-shaped spacer with double extension legs and integral setting blocks that can be used in the embodiment of FIGS. 20A to 20F.

FIGS. 21 to 25 illustrate various possible designs for the spacer 162. In FIG. 21, a straight spacer is shown. FIG. 22 shows a T-shaped spacer 162A, having a plurality of legs 161 that abut the inside perimeter of the sash frame. Due to the spacing between the legs, an adhesive can be applied via backfilling (as illustrated, e.g., in FIG. 20E), and the adhesive will flow between and around the legs to secure the spacer and glazing panes. FIG. 23 illustrates a T-shaped spacer 162B having extensions 163. The extensions can serve as a setting block for the lower glazing pane as shown in FIG. 23. As shown in FIG. 24, a T-shaped spacer 162C with dual leg extensions 165 can be provided, with the extensions provided setting blocks for both the lower and upper panes. Moreover, as shown in FIG. 25, a T-shaped spacer 162D can be provided with a raised setting block portion 167 for accommodating different size glass panes. As indicated above in connection with FIGS. 20A to 20F, the use of different size panes facilitates the backfilling of the assembly with an adhesive (e.g., adhesive 166 shown in FIG. 20E). It should be appreciated that spacers having other shapes can also be used in connection with the invention.

Figure 26:
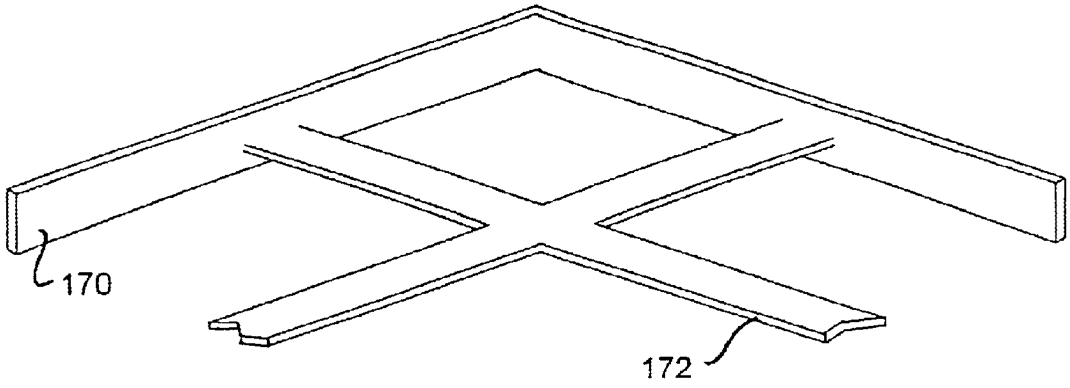
FIG. 26 illustrates a spacer with integral simulated muntin bars.
Figure 27:
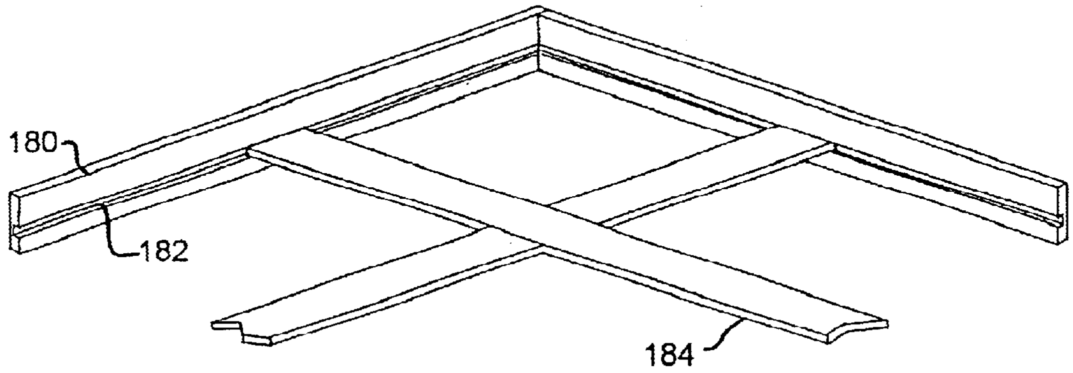
FIG. 27 illustrates a spacer with a groove for holding integral simulated muntin bars.

As an optional feature, the spacer between the glazing panes can accommodate, or include, simulated muntin bars. FIG. 26 illustrates a spacer 170 with integral simulated muntin bars 172. FIG. 27 illustrates a spacer 180 with a groove 182 for holding integral simulated muntin bars 184. Instead of the groove 182 being recessed into the spacer 180 as shown, it can be formed using parallel legs which extend from the spacer. Any other suitable structure, such as clips, pins or the like, can alternatively be used to mount or otherwise fasten a simulated muntin bar assembly or individual simulated muntin bars to the spacer.

It should now be appreciated that the present invention provides a method for fabricating an integrated sash structure, which includes a sash frame, an adhesive mounting arrangement, and glazing panes (such as glass or plastic) mounted to the adhesive mounting structure. The resulting assembly provides a single unit insulating sash without the need to manufacture a separate insulating glass (IG) unit, which must then be mounted into a separate sash frame. This structure provides significant efficiencies in manufacturing and provides a product with superior performance at a reduced cost.

In accordance with the invention, a sash frame is provided which has a glazing pane installation opening accessible from a first side thereof and a glazing pane support surface on a second side thereof. A first glazing pane is inserted into the opening. An outside surface perimeter of the pane is placed adjacent to the support surface (e.g., directly on the support surface or on an intervening layer such as a cushioning, adhesive and/or sealant layer). A second glazing pane is inserted into the opening and an inside surface perimeter of the second pane is mounted adjacent to an inside surface perimeter of said first glazing pane. A glazing bead is installed along at least a portion of the glazing pane installation opening after the glazing panes have been inserted. In one embodiment, an integrated one component desiccated/sealant-adhesive is provided to mount the glazing panes together with a space therebetween. The space can be filled with an inert gas, such as Argon, to improve the insulating qualities of the finished unit.

Various other mounting arrangements are also contemplated in accordance with the present invention. For example, instead of mounting subsequent glazing panes directly to previous glazing panes via an adhesive, the panes can be mounted adjacent to one another via spacing clips or the like, via projections from the sash frame, or via other structures that allow the fabrication of an integrated insulating glass and sash assembly by inserting glazing panes through an installation opening in the sash frame.

Although the invention has been described in connection with several particular embodiments, it will be appreciated that various adaptations and modifications may be made thereto without departing from the scope of the invention, as set forth in the claims.

What is claimed is:

1. A method for fabricating an integrated multipane window sash comprising:

providing a sash frame having a common glazing pane installation opening for at least two glazing panes, said opening being accessible from a first side of said sash frame and a glazing pane support surface on a second side thereof, said opening being defined by a shelf extending transversely from said glazing pane support surface around a perimeter of said sash frame;

first, inserting a first glazing pane into said opening from said first side and placing an outside surface perimeter of said pane adjacent to said support surface with a sealant therebetween;

second, inserting a second glazing pane into said opening from said first side and mounting an inside surface perimeter of said second pane to an inside surface perimeter of said first glazing pane via an adhesive; and third, installing at least one glazing bead along at least a portion of the glazing pane installation opening after the glazing panes have been inserted.

2. A method in accordance with claim 1 wherein at least one additional glazing pane is inserted into said opening and mounted adjacent to a previous glazing pane prior to said glazing bead installing step.

3. A method in accordance with claim 1 wherein said adhesive is an adhesive sealant or foam.

4. A method in accordance with claim 1 wherein said adhesive is applied to at least a portion of the inside surface perimeter of said first glazing pane.

5. A method in accordance with claim 1 wherein said adhesive is applied to at least a portion of the inside surface perimeter of said second glazing pane.

6. A method in accordance with claim 1 wherein said adhesive is applied to at least a portion of said sash frame.

7. A method in accordance with claim 1 wherein said adhesive comprises at least one of:

(i) a bead of adhesive, (ii) a preformed adhesive foam, (iii) an expanding adhesive foam, (iv) a preformed adhesive tape, (v) a desiccated adhesive, (vi) a chemical sealant.

8. A method in accordance with claim 1 wherein at least a portion of the outside surface perimeter of said first glazing pane is adhesively mounted to said support surface.

9. A method in accordance with claim 1 wherein at least a portion of the outside surface perimeter of said first glazing pane is adhesively mounted to said support surface via at least one of:

(i) a bead of adhesive, (ii) a preformed adhesive foam, (iii) an expanding adhesive foam, (iv) a preformed adhesive tape, (v) a desiccated adhesive, (vi) a chemical sealant.

10. A method in accordance with claim 1 wherein said support surface comprises a lip extending around the second side of said sash frame.

11. A method in accordance with claim 1 comprising the further step of providing a desiccant between said first and second glazing panes.

12. A method in accordance with claim 1 wherein said glazing bead exerts pressure on the outside surface perimeter of the last glazing pane inserted into said glazing pane installation opening, thereby biasing the glazing panes toward said support surface.

13. A method in accordance with claim 1, comprising the further step of providing setting blocks on said sash frame to facilitate positioning of at least one of said glazing panes.

14. A method in accordance with claim 1, wherein the first glazing pane is mounted to float on the support surface and the second glazing pane is mounted to float on said first glazing pane, such that the glazing panes function independently with respect to stresses.

15. A method in accordance with claim 1, wherein:

the outside surface perimeter of said first glazing pane is adhesively mounted to said support surface via an adhesive that is applied to at least a portion of the support surface by co-extrusion with a sash profile used to fabricate said sash frame.

16. A method in accordance with claim 1, wherein:

the outside surface perimeter of said first glazing pane is adhesively mounted to said support surface via an adhesive that is applied to at least a portion of the support surface by extrusion after fabrication of said sash frame.

17. A method in accordance with claim 1, comprising:

applying an adhesive to at least a portion of the outside surface perimeter of said first glazing pane and then adhesively mounting said first glazing pane to said support surface.

18. A method in accordance with claim 1 wherein:

at least one of said glazing panes is mounted within said sash frame using an adhesive; and edges of said at least one glazing pane are at least partially embedded into the adhesive.

19. method in accordance with claim 1, further comprising applying an adhesive between said glazing bead and an adjacent glazing pane.

20. A method in accordance with claim 1, further comprising installing a gasket between said glazing bead and an adjacent glazing pane.

21. A method in accordance with claim 1, wherein edges of said glazing panes are substantially completely embedded in adhesive.

22. A method in accordance with claim 1 wherein said glazing bead comprises a rigid strip that is attached to said sash frame.

23. A method in accordance with claim 1 wherein said glazing bead comprises a flexible adhesive material.

24. A method in accordance with claim 1, comprising:

applying an adhesive between at least a portion of the outside surface perimeter of said first glazing pane and said support surface, and providing a first dam leg between said support surface and an inside perimeter of said sash frame to isolate the adhesive from a space between said first and second glazing panes.

25. A method in accordance with claim 24, comprising:

providing a second dam leg in parallel with said first dam leg such that said adhesive is constrained between the dam legs.

26. A method in accordance with claim 1, wherein the second pane is mounted to said first pane with a space therebetween.

27. A method in accordance with claim 26 comprising the further steps of:

filling said space with an inert gas; and sealing the space to prevent leakage of said gas therefrom.

28. A method in accordance with claim 1, further comprising installing at least one spacing clip between said first and second glazing panes.

29. A method in accordance with claim 28, wherein said spacing clip is adapted to secure at least one muntin bar within a space defined by the spacing clip between said first and second glazing panes.

30. A method in accordance with claim 1 further comprising filling a cavity between said spacer and an inside perimeter of said sash frame with an adhesive.

31. A method in accordance with claim 30 wherein said cavity is partially filled from the spacer toward the sash frame, without the adhesive contacting the inside perimeter.

32. A method in accordance with claim 30 wherein said cavity is substantially completely filled from the spacer to said inside perimeter, with the adhesive contacting the inside perimeter.

33. A method in accordance with claim 30, wherein edges of said glazing panes are at least partially embedded in said adhesive.

34. A method in accordance with claim 1 wherein said second pane is mounted to said first pane via a spacer.

35. A method in accordance with claim 34 comprising using a portion of said spacer as a setting block for at least one glazing pane.

36. A method in accordance with claim 34 further comprising providing at least one simulated muntin bar integral with said spacer.

37. A method in accordance with claim 34 wherein said spacer comprises at least one of:

(i) a bead of adhesive, (ii) a bead of desiccant, (iii) a preformed rigid material, (iv) a preformed or expanding foam, (v) a preformed adhesive (vi) a preformed desiccant material.

38. A method in accordance with claim 34 wherein the glazing panes are of unequal size.

39. A method in accordance with claim 34 wherein at least a portion of said spacer is T-shaped.

40. A method in accordance with claim 29 wherein said spacer includes a setting block portion.

41. A method in accordance with claim 34 further comprising providing said spacer with a mounting element for at least one simulated muntin bar.

42. A method in accordance with claim 41 wherein said mounting element comprises a groove associated with said spacer.

* * * * *

UNITED STATES PATENT AND TRADEMARK OFFICE

CERTIFICATE OF CORRECTION

PATENT NO. : 6,974,518 B2
APPLICATION NO. : 09/925293
DATED : December 13, 2005
INVENTOR(S) : Hornung et al.

It is certified that error appears in the above-identified patent and that said Letters Patent is hereby corrected as shown below:

Please delete columns 1 line 1 through columns 16 line 39 and insert columns 1 line 1 through columns 16 line 34 as attached Signed and Sealed this Twenty-fifth Day of March, 2008

JON W. DUDAS

*Director of the United States Patent and Trademark Office*

METHOD FOR FABRICATING AN INTEGRATED MULTIPANE WINDOW SASH

This application is a continuation-in-part of commonly assigned, U.S. patent application Ser. No. 09/882,295 filed Jun. 15, 2001, now U.S. Pat. No. 6,662,523.

BACKGROUND OF THE INVENTION

1. Field of the Invention

The present invention relates generally to residential, commercial, and architectural windows and, more particularly, to a method for manufacturing an integrated multipane window unit and sash assembly.

2. Description of the Related Art

As is currently well-known in the art, insulating glass units, or IG units, are widely used as elements of windows, skylights, doors and related products, including vehicles. Such units are used to reduce heat loss from building interiors in winter, and reduce heat gain into air-conditioned buildings in summer. The insulating glass units are typically formed separately from the sash, and then in a separate step the insulating glass unit is installed in a sash.

A detailed description of the manufacture and installation of conventional IG units can be found in J. France U.S. patent application Ser. No. 09/307,825 filed on May 7, 1999, entitled "Integrated Multipane Window Unit and Sash Assembly and Method for Manufacturing the Same", now U.S. Pat. No. 6,286,288, 52/786.13 corresponding to PCT published application WO 00/68539 dated Nov. 16, 2000, both incorporated herein by reference. In addition to providing a comprehensive explanation of the prior art, the aforementioned patent discloses an improved but less complex insulating glass structure that is integrated with the window sash.

More particularly, the aforementioned patent discloses a multipane window unit in which a sash frame is formed having an integral spacing structure upon which glazing panes are directly affixed. The integral spacing structure provides vertical internal glazing surfaces extending from the sash. Adhesive can be affixed to the vertical internal glazing surfaces to attach the glazing panes. In this manner, a rigid, structural sash frame is formed prior to attachment of the glazing panes, thereby eliminating the need for using separately manufactured insulating glass units, while obtaining similar and improved thermal benefits.

The present invention provides further improvements to the manufacture of insulating glass structures for use in windows, doors and the like, while incorporating the basic concept of the aforementioned patent, i.e., the provision of a sash and IG unit in an integrated structure. In particular, the present invention provides, inter alia, an integrated insulating glass and sash manufacturing method where parallel glass panes are inserted directly into the sash and mounted by an adhesive mounting or an adhesive mounting and spacing structure. Advantageously, such an adhesive can be applied to the sash and/or to one or more of the glazing panes directly in the form of a bead, such as a bead of sealant which can also function as the spacer element between the glazing panes. Alternatively, at least a portion of the adhesive can be co-extruded (or post-extruded) with the sash profile. Still further, the adhesive can comprise an integrated, single component desiccated sealant-adhesive glazing material. In a particularly advantageous embodiment, this material can be preformed into a variety of shapes and sizes, thereby providing, when applied to the sash profile and/or the glazing panes, an integrated sash/glazing assembly method.

It is noted that although the invention is described using glass panes, panes of other materials can be substituted. Such panes can comprise, for example, clear or frosted plastic, such as Plexiglas, tempered glass, safety glass, security glass, privacy glass, or any other known glazing material.

SUMMARY OF THE INVENTION

In accordance with the invention, a method is provided for fabricating an integrated multipane window sash. A sash frame is provided having a glazing pane installation opening accessible from a first side thereof and a glazing pane support surface on a second side thereof. A first glazing pane is inserted into the installation opening. An outside surface perimeter of the pane is placed adjacent to the support surface. A second glazing pane is inserted into the opening. An inside surface perimeter of the second pane is mounted adjacent to an inside surface perimeter of the first glazing pane. A glazing bead is installed along at least a portion of the glazing pane installation opening after the glazing panes have been inserted. It is noted that the glazing bead can comprise any type of suitable covering, such as a strip or frame formed from the same or similar material as the sash frame, a strip or frame formed from a different material than the sash frame, or a bead of adhesive, sealant, caulk, preformed or expanding adhesive foam, tape, or the like.

At least one additional glazing pane can be inserted into the opening and mounted adjacent to a previous glazing pane prior to installation of the glazing bead. In this manner, for example, a triple glazed unit can be manufactured. It should be appreciated that any number of glazing panes can be stacked within the sash frame in accordance with the invention, thereby providing the capability of manufacturing double pane, triple pane, quadruple pane, etc. windows.

The second pane can be mounted adjacent to the first pane via an adhesive, which may be applied, for example, to at least a portion of the inside surface perimeter of the first glazing pane. The adhesive can also (or alternatively) be applied to at least a portion of the inside surface perimeter of the second glazing pane. The adhesive can also (or alternatively) be applied to at least a portion of the sash frame. The adhesive can comprise any of a variety of different adhesive types and structures, such as a bead of adhesive (sometimes referred to as "sealant"), a preformed or expanding adhesive foam, a preformed adhesive tape, and/or a chemical sealant. Spacing clips can be provided as necessary to provide structure and/or maintain a constant spacing between the glazing panes.

In one embodiment, at least a portion of the outside surface perimeter of the first glazing pane is adhesively mounted to the support surface of the sash frame. Again, any suitable adhesive, including those described above, can be used. The support surface can comprise, for example, a lip which extends around the second side of said sash frame.

A desiccant can be provided between the first and second glazing panes. The desiccant can be either separate from the adhesive, or can be impregnated within the adhesive, i.e., a "desiccated adhesive."

In one embodiment, the glazing bead exerts pressure on the outside surface perimeter of the last glazing pane inserted into said glazing pane installation opening. The glazing bead thereby biases the glazing panes toward the support surface in order to facilitate the structural integrity of the unit and to hold the panes tightly within the sash. In an optional embodiment, setting blocks are provided adjacent to the support surface to facilitate positioning of at least one of the glazing panes within the sash frame.

The first glazing pane can be mounted to float on the support surface. Similarly, the second (and subsequent) glazing pane(s) can be mounted to float on the preceding glazing pane, such that the glazing panes function independently with respect to stresses.

The outside surface perimeter of the first glazing pane can be adhesively mounted to the support surface via an adhesive that is applied to at least a portion of the support surface by co-extrusion with a sash profile used to fabricate said sash frame. Alternatively, the outside surface perimeter of the first glazing pane can be adhesively mounted to the support surface via an adhesive that is applied to at least a portion of the support surface by extrusion after fabrication of said sash frame. In yet another embodiment, an adhesive is applied to at least a portion of the outside surface perimeter of the first glazing pane to adhesively mount the first glazing pane to the support surface.

In an embodiment where at least one of the glazing panes is mounted within the sash frame using an adhesive, edges of the pane can be at least partially embedded into the adhesive.

In order to provide an insulating glass structure, the second pane will usually be mounted adjacent to the first pane with a space therebetween. The space can be filled with an inert gas to improve the insulating quality of the unit, and sealed to prevent leakage of the gas therefrom.

In one illustrated embodiment, the second pane is mounted to the first pane via a spacer. The panes may be of the same or different (unequal) sizes. A cavity between the spacer and an inside perimeter of the sash frame can be filled with an adhesive. The cavity can be partially filled from the spacer toward the sash frame, without the adhesive contacting the inside perimeter. Alternatively, the cavity can be substantially completely filled from the spacer to the inside perimeter, with the adhesive contacting the inside perimeter. Edges of the glazing panes can be at least partially embedded in the adhesive.

In a further embodiment, a portion of the spacer is used as a setting block for at least one of the glazing panes. For example, the spacer can be substantially T-shaped, and can include a setting block portion.

At least one simulated muntin bar can be provided integral with the spacer. Alternatively, the spacer can be provided with a mounting element, such as a groove, for at least one simulated muntin bar or muntin bar assembly.

The spacer can, for example, comprise at least one of a bead of adhesive, a bead of desiccant, a preformed rigid material, a preformed or expanding foam, a preformed adhesive, and/or a preformed desiccant material.

The glazing bead can comprise, e.g., a flexible adhesive material, or a rigid strip that is attached to the sash frame.

In embodiments where an adhesive is provided between at least a portion of the outside surface perimeter of the first glazing pane and the support surface, a first dam leg can be provided between the support surface and an inside perimeter of the sash frame. The dam leg is intended to isolate the adhesive from the space between the first and second glazing panes, and more particularly from any adhesive or other material between the panes. A second dam leg can be provided in parallel with said first dam leg, such that the adhesive applied between the first pane and the support surface is constrained between the dam legs.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is a perspective view showing a window sash profile portion with reinforcing ribs, the profile having insulating glass mounted thereto via an adhesive spacing and mounting structure;

FIG. 2 is a front plan view of the embodiment of FIG. 1;

FIG. 3 is a perspective view showing a window sash profile portion without reinforcing ribs, the profile having insulating glass mounted thereto via an adhesive spacing and mounting structure;

FIG. 4 is a front plan view of the embodiment of FIG. 3;

FIG. 5 is a perspective cross-sectional view of a portion of a window sash assembly;

FIG. 6 is an exploded cross-sectional view of an adhesive spacing and mounting structure having channels for holding a muntin assembly;

FIG. 7 is a cross-sectional view of an embodiment where the glazing panes are partially embedded in the adhesive spacing and mounting structure and an adhesive bead is used to replace a conventional glazing bead;

FIG. 8 is a cross-sectional view of an alternative embodiment wherein two separate adhesive mounting strips or beads are used instead of the adhesive spacing and mounting structure shown in FIGS. 1 to 7;

FIG. 9 is a cross-sectional view of another embodiment similar to that shown in FIG. 8, but wherein the glazing panes are mounted on opposite sides;

FIG. 10 is a cross-sectional view of another embodiment similar to that shown in FIGS. 8 and 9, but wherein the glazing panes are both mounted via outside surfaces thereof;

FIG. 11 is an exploded view showing the assembly of an integrated multipane window unit and sash in accordance with the invention;

FIG. 12 is a cross-sectional view of an integrated multipane window unit and sash assembly fabricated in accordance with the invention;

FIG. 13 is a cross-sectional view of an integrated triple pane window unit and sash assembly fabricated in accordance with the invention;

FIG. 14 is a cross-sectional view of an embodiment of an integrated multipane window unit and sash assembly fabricated in accordance with the invention, in which adhesive between the glazing panes also contacts the sash frame; and FIG. 15 is an exploded view similar to FIG. 11, but in which separate glazing beads are used for each side of the sash.

FIG. 16 is a perspective view of a portion of a sash profile in which integral setting blocks are provided for edges of the glazing panes;

FIG. 17 is a cross-sectional view of an embodiment incorporating an adhesive layer or gasket between the glazing bead and the adjacent glazing pane, as well as integral setting blocks;

FIG. 18 is a cross-sectional view of an embodiment in which edges of the glazing panes are completely embedded in adhesive;

FIG. 19 is a partial perspective view illustrating spacer clips which also function as simulated muntin bar mounts in accordance with the invention;

FIGS. 20A to 20F illustrate the assembly of an integrated multipane window sash in accordance with an alternative embodiment of the invention;

FIG. 21 illustrates a flat spacer that can be used in the embodiment of FIGS. 20A to 20F;

FIG. 22 illustrates a T-shaped spacer that can be used in the embodiment of FIGS. 20A to 20F;

FIG. 23 illustrates a T-shaped spacer with extension legs that can be used in the embodiment of FIGS. 20A to 20F;

FIG. 24 illustrates a T-shaped spacer with double extension legs that can be used in the embodiment of FIGS. 20A to 20F;

FIG. 25 illustrates a T-shaped spacer with double extension legs and integral setting blocks that can be used in the embodiment of FIGS. 20A to 20F;

FIG. 26 illustrates a spacer with integral simulated muntin bars;

FIG. 27 illustrates a spacer with a groove for holding integral simulated muntin bars; and FIG. 28 is a cross-sectional view of an embodiment where the adhesive between the glazing panes does not extend to the inside perimeter of the sash frame.

DETAILED DESCRIPTION OF THE INVENTION

Referring now to FIGS. 1 and 2, a sash profile 10, which may be fabricated from vinyl, e.g., polyvinyl chloride (PVC) or any other material used for window frames, such as aluminum, wood, other plastics and the like, is provided for use in manufacturing an insulating glass window. The sash profile can be fabricated in any known manner, for example, by extrusion or injection molding. Although only a short section of the profile 10 is illustrated, it should be appreciated that the profile material will be provided in various lengths necessary to assemble a complete sash frame, which may be square, rectangular, oval, circular, or any other custom window shape as well known in the art. The illustrated profile 10 includes a channel 12 for retaining a glazing bead or clip (not shown) as well known in the art. As disclosed herein, the prior art glazing bead technology can be replaced with a glazing bead of adhesive sealant 60, as shown in FIG. 7, resulting in a dual sealed unit. For example, a bead of sealant can be applied adjacent to each glazing pane and the base 14 of the sash profile to cover the edges of the glass and define the viewing opening in an aesthetically pleasing manner. Preferably, the bead of adhesive sealant will match the sash profile in color. Alternatively a neutral color or translucent bead can be used. Moreover, the bead can be of any shape, such as the decorative shape illustrated in FIG. 7, a simple quarter round bead, or the like. Still further, it is desirable to have the top of the bead extend above the top of the adhesive spacing and mounting structure, so that the sides of the adhesive spacing and mounting structure will not be visible through the finished window. Various sealants, including silicone sealants, are suitable for use in forming the bead 60. Preferably, the material will be one that is and remains flexible, such that the glazing panes can float on the adhesive spacing and mounting structure without being locked in place by the bead 60, which may cause undesirable stresses to occur with thermal expansion and contraction, atmospheric pressure changes, and the like.

In an alternate embodiment, the sealant 60 can be one that dries substantially hard, having the appearance that it is part of the sash profile itself. In such an embodiment, the sealant does not have to make actual contact with the glass pane, but it would have to be in close proximity to the glass pane for aesthetic reasons. Obviously, if the sealant does not contact the glass, a double sealed unit will not result.

The glazing bead can alternatively comprise any other suitable material for covering the edges of the outermost glazing pane, resulting in a neat appearance for the completed integrated multipane sash assembly. Such materials include, without limitation, sealant, caulk, preformed or expanding adhesive foam, tape, and the like.

Sash profile 10 includes an inside perimeter portion 14 (sometimes referred to herein as the sash profile "base"), which, in the embodiment illustrated in FIGS. 1 and 2, includes ribs 16 extending therefrom. The ribs are provided to reinforce an adhesive spacing and mounting structure 18, which can comprise any of a plurality of different materials, such as foams, tapes, chemical sealants, silicone materials which may be cured, e.g., by heat, air, light, ultraviolet (UV) radiation, or the like, and/or other adhesive compounds designed to meet the necessary structural and sealing requirements of insulating glass windows. Where a preformed adhesive spacing and mounting structure 18 is used, such as a rigid, semi-rigid or flexible foam, grooves can be provided therein which mate with the ribs 16. Where a viscous substance (e.g., a chemical sealant) is used for the adhesive spacing and mounting structure, the substance is applied such that it conforms to and surrounds the ribs. Such application can be made, for example, by extruding along with the sash profile, by extruding after the profile is extruded, by application as a bead after extrusion of the profile, or by any other suitable manual or automatic (e.g., robotic) application technique. It should also be appreciated that the structure of the ribs 16 shown in FIGS. 1 and 2 is for purposes of illustration only, and any number of ribs having any suitable shape, such as a "J" or "L" shape, may be used for purposes of providing reinforcement to the adhesive spacing and mounting structure 18. The ribs can also function to guide a robotic arm or the like during application of the adhesive.

The surface of the base 14 of the sash profile and/or the surface of the ribs 16 can be roughened, if necessary, to provide an improved bond with the adhesive spacing and mounting structure. Other surface treatments can also be provided, e.g., during the sash profile extrusion process, to improve the ultimate bond with the adhesive material. For example, a bonding agent can be applied to the inside perimeter of the sash profile prior to application of the adhesive spacing and mounting structure.

The adhesive spacing and mounting structure is used to attach glass panes 20 and 22 to the sash profile 10. Although only two panes are illustrated in the Figures, it should be appreciated that the structures disclosed herein can be used with windows having three or more panes, as well. As can be seen, the spacing and mounting structure extends from the base 14 of the window sash, and will define a viewing perimeter smaller than the inside perimeter of the sash frame. The glass panes adhere to the structure 18 due to its adhesive nature, and when assembled in the sash frame in this manner, an insulating sash/glass structure results.

The adhesive spacing and mounting structure disclosed herein can have any shape that is suitable for mounting the glass panes to the sash profile. Thus, the substantially rectangular cross section of adhesive spacing and mounting structure 18 illustrated in FIG. 2 is an example only. The basic requirements for the adhesive spacing and mounting structure are that it has enough adhesive strength and structural rigidity to securely hold the glass panes onto the sash profile. Moreover, it must provide a hermetic seal for the space between the glass panes. It must also provide the desired spacing between the panes, which will be a function of how wide the adhesive spacing and mounting structure is when it is applied to the sash profile. The adhesive spacing and mounting structure should also be a thermal insulator, in order to avoid the problems of prior art metal spacer structures which result in windows that are prone to condensation at the viewing area edges. Still further, the adhesive spacing and mounting structure should include a desiccant, either combined therewith or provided, e.g., as a coating thereon.

Another example shape for the adhesive spacing and mounting structure 18 is illustrated in FIGS. 3 and 4. In this example embodiment, the adhesive spacing and mounting structure has an inverted U-shape with respect to the base 14 of the sash profile 10'. It is noted that the example implementation shown in FIGS. 3 and 4 does not include ribs as part of the sash profile. However, ribs such as those shown in FIGS. 1 and 2 could be provided, if desired.

FIGS. 3 and 4 also illustrate the use of setting blocks 24. These blocks can be formed integrally with the sash profile 10', or can be separately attached to the base 14 of the sash profile. The purpose of the setting blocks is to provide a fixed stop for the glazing panes 20, 22. The setting blocks also function to raise the glazing panes away from the elements, such as water, moisture, or even incompatible sealants. The use of such setting blocks can also facilitate the automated placement and proper location of the glazing panes. As an alternative to the setting blocks, a continuous setting strip can be pre-extruded or post-extruded along with the sash profile. Where a setting strip is used, it is preferable to provide openings, such as holes, spaced along the strip in order to allow volatiles from the adhesive spacing and mounting structure and/or from the sash profile to escape (i.e., outgas), if necessary, and for sealant to cure.

FIG. 5 illustrates a portion of a completed sash assembly in accordance with the present disclosure. Although only horizontal sash profiles 10" are illustrated, it should be appreciated that the assembly will also have vertical sash profiles to complete the window opening. The adhesive spacing and mounting structure 32 illustrated in FIG. 5 has a rectangular cross-section, although as noted above, any suitable shape can be used, with or without setting blocks, a setting strip and/or ribs as described above. Moreover, the edges of glazing panes 22 could be embedded into the adhesive spacing and mounting structure 32, either fully or partially. Where the glazing panes are fully embedded into the adhesive spacing and mounting structure, setting blocks or strips will not be necessary, as the adhesive spacing and mounting structure itself will provide similar functionality.

FIG. 6 is an exploded cross sectional view of an adhesive spacing and mounting structure 40, which includes receptacles 46 for receiving a muntin clip 42. The muntin clip, in turn, receives a simulated muntin bar 44 which has a hollow (female) end 50 adapted to receive a male retaining portion 52 of clip 42. In this manner, the adhesive spacing and mounting structure can support a simulated muntin assembly between the glazing panes, providing, e.g., a window unit with a colonial appearance. Other size and shape clips can be used, together with corresponding receptacles at both the simulated muntin bar and the adhesive spacing and mounting structure. Moreover, the muntin bar could provide a male insert and the muntin clip could provide a female receptacle, instead of the opposite arrangement illustrated. Thus, the implementation illustrated in FIG. 6 is only an example showing how one or more muntin bars can be mounted between the glazing panes.

FIG. 7 illustrates an embodiment where the glazing panes 20, 22 are partially embedded in the adhesive spacing and mounting structure. As described above, either full or partial embedding can be provided. FIG. 7 also illustrates the adhesive bead 60 which, as described above, can be used instead of a conventional plastic or metal glazing bead. It is noted that the embedding and adhesive bead features illustrated in FIG. 7 are independent features, and do not have to be used together.

FIG. 8 illustrates an embodiment wherein each glazing pane 20, 22 is mounted to the base 14 of the sash using a separate bead or strip of adhesive. As shown, pane 20 is adhesively mounted via a first strip of adhesive material 70, and pane 22 is adhesively mounted via a second strip of adhesive material 72. The adhesive strips (e.g., beads) must be made from a material such as foam, tape, chemical sealants, silicone materials which may be cured, e.g., by heat, air, light, ultraviolet (UV) radiation, or the like, and/or other adhesive compounds designed to meet the necessary structural and sealing requirements of the window units.

FIG. 9 is an embodiment similar to that shown in FIG. 8. However, in FIG. 9, the inside surface of glazing pane 20 is mounted to adhesive mounting structure 70, whereas the outside surface of glazing pane 22 is mounted to adhesive mounting structure 72.

FIG. 10 is an embodiment similar to that shown in FIGS. 8 and 9. However, in FIG. 10, the outside surfaces of both glazing panes 20 and 22 are mounted to their respective adhesive mounting structures 70, 72.

The alternative structures and materials discussed in connection with the embodiments of FIGS. 1 to 7 are also applicable to the embodiments of FIGS. 8 to 10. Thus, for example, ribs (such as ribs 16 shown in FIGS. 1 and 2) and glazing blocks or strips (as shown in FIGS. 3 and 4) can be provided in the embodiments of FIGS. 8 to 10, as well as in any of the other embodiments illustrated. A bead of adhesive sealant 60 as described in connection with FIG. 7 can also be provided in any of the embodiments disclosed herein.

In accordance with the present disclosure, any number of glazing panes can be mounted to a sash frame. For example, a triple glazed unit can be fabricated using one adhesive mounting and spacing structure for two panes, mounted, e.g., as shown in FIGS. 3 and 4, with the third pane mounted to a separate adhesive bead as illustrated in FIG. 8 or 9. Alternatively, separate adhesive beads can be used to mount all three (or more) panes to the sash. Moreover, as is evident from FIGS. 8, 9 and 10, the panes can be mounted on either side thereof.

In FIGS. 8 to 10, the edges of the glazing panes contact their respective adhesive strips, but are not embedded in the adhesive. It should be appreciated, however, that the panes could also be partially or completely embedded in the strips, as discussed in connection with FIG. 7. In order to desiccate the space between the glazing panes in the embodiments of FIGS. 8 and 9, a separate desiccant can be placed in the space between the adhesive strips 70, 72 (FIG. 8), in the space between adhesive strip 70 and glazing pane 22 (FIG. 9), or the adhesive material used to form the strips can be impregnated with a desiccant material. In the latter case, only adhesive strip 70 would have to be desiccated in the embodiment of FIG. 9, unless a third glazing pane is provided in a manner that would result in strip 72 being sealed between respective panes. In the embodiment of FIG. 10, the desiccant would be placed in the space between the glazing panes 20, 22.

In the preferred embodiments, the adhesive strips of FIGS. 8 to 10 will have enough structural support to maintain a consistent desired spacing between the substantially parallel glazing panes. However, where this is not the case, intermittent spacing bars, tabs or similar spacer structures can be integrally formed on or mounted to the base 14 of the sash profile, in order to maintain the proper spacing.

FIG. 11 is an exploded perspective view that illustrates the fabrication of an integrated multipane window sash in accordance with the present invention. Although a horizontally oriented fabrication is shown for purposes of explanation, it should be appreciated that a vertically oriented fabrication can also be implemented, although the horizontal fabrication lends itself to an easier assembly.

As indicated in FIG. 11, the method of the invention starts out with a sash frame 100 which includes a glazing pane installation opening 101 that is accessible from a first side of the sash frame. A glazing pane support surface 110 is provided on a second side of the sash frame 100. An integrated multipane sash assembly is assembled by inserting a first glazing pane 102 into the installation opening 101. An outside surface perimeter 116 of the glazing pane 102 is placed adjacent to the support surface 110. An optional layer 112, which can comprise sealant, adhesive tape, adhesive foam, a bulb seal, a gasket (e.g., butyl tape, foam, weather-stripping, etc.), or the like, can be provided between the glazing pane perimeter and the support surface 110. The use of such an adhesive can provide additional structural integrity to the completed unit. The layer 112 can also, or alternatively, provide a cushioning surface for the edges of the glazing pane 102.

After the first glazing pane is installed, a second glazing pane 106 is mounted adjacent to the first glazing pane. This can be accomplished, for example, by providing an adhesive, such as a preformed adhesive 104, between the respective glass panes. More particularly, a preformed adhesive bead, tape, foam (preformed or expanding) or the like can be applied to the inside surface perimeter 118 of the first glazing pane. Alternatively, the adhesive 104 can be applied to the inside surface perimeter 120 of the second glazing pane 106, or the adhesive can be applied to the inside perimeter of the sash frame 100. Regardless of how the adhesive is applied, the goal is to position it such that it will join the glazing panes 102, 106 along their respective inside perimeter surfaces 118, 120, with a space therebetween. The space is intended to enclose air or an inert gas for insulating purposes, as well known in the insulating glass art.

Although only two glazing panes are illustrated in FIG. 11, it should be appreciated that any number of such panes can be provided in accordance with the invention. Generally, double and triple pane insulating glass products are provided in the market. However, there is no reason that quadruple pane and higher cannot be provided in accordance with the present invention. An example of a triple pane embodiment is shown in FIG. 13.

After all of the desired glazing panes have been inserted into the sash frame, a glazing bead 108 is installed along at least a portion of the glazing pane installation opening 101. In the embodiment of FIG. 11, the glazing bead 108 is a prefabricated component that is designed to snap into a receptacle 114 of the sash frame. The glazing bead 108 can be designed to provide additional structural support by biasing the assembly of glazing panes against the support surface 110. The glazing bead also serves to cover the edges of the glazing panes as well as the adhesive (which would otherwise be visible through the panes)for aesthetic purposes. As indicated in FIG. 17, an adhesive 109 can be applied between the glazing pane 106 and the glazing bead 108.

FIGS. 12 and 13 show cross sectional views of integrated multipane window sashes fabricated in accordance with the technique illustrated in FIG. 11. As shown in these figures, the support surface 110 of the sash frame 100 can be provided with a leg (sometimes referred to as a "dam leg") 111, which provides a recess for the optional layer 112. In the event layer 112 comprises a material having low viscosity (such as traditional silicone known in the glazing industry), the dam leg 111 will prevent runoff of the material when it is applied. Typically, the glazing pane 102 will be in contact with the top of leg 111. It should be appreciated, however, that if the layer 112 comprises a structural material, such as a type of foam, viscous adhesive or sealant, or a semi-rigid layer, the layer 112 can provide sufficient support to the glazing pane such that the pane will not come into contact with the leg 111.

In the triple pane embodiment of FIG. 13, a third glazing pane 107 is mounted adjacent to the second glazing pane 106'. In the illustrated embodiment, the inside surface perimeters of panes 102 and 106' are joined via adhesive 103. The inside surface perimeter 123 of pane 107 is joined to the facing (also inside) surface 121 of pane 106'. It should be appreciated that since glazing pane 106' is situated between panes 102 and 107, both surfaces thereof can be regarded as "inside" surfaces.

FIG. 14 illustrates an embodiment similar to that shown in FIG. 12, but wherein the adhesive 104' extends beyond the edges of the glazing panes to contact a portion of the sash frame 100. Such an embodiment can be fabricated, for example, by applying the adhesive 104' to the inside surface 118 of glazing pane 102 in a manner that overlaps the edge and contacts the sash frame. For example, the adhesive can comprise a bead of sealant or the like, or an adhesive tape or foam, that is applied to both the glazing pane and the sash frame in a single operation. Additional structural integrity is provided by applying the adhesive layer(s)to both the glazing panes and the sash frame.

FIG. 15 illustrates an embodiment similar to that of FIG. 11, except that separate glazing beads 108 A, 108 B, 108 C and 108 D are provided for each side of the sash frame. These glazing beads can be mounted to the sash frame in any suitable manner, such as via a snap fit, sliding fit, adhesive mount, welding operation, or the like.

FIG. 16 illustrates a portion of a sash profile 135 that can be used to fabricate the sash frame 100, in which integral setting blocks 130 and 132 are provided. The setting blocks can, for example, be injection molded together with the sash frame, can be machined into the sash frame by milling or cutting, or can be manufactured in any other known manner, such as by gluing or welding separate pieces to the sash profile. As illustrated in FIG. 17, the glazing panes 102 and 106 are installed such that their edges abut the respective setting blocks 130, 132. It is noted that if setting blocks are not provided, the edges of the glazing panes may directly contact the inside perimeter of the sash frame, instead of being spaced away from the sash frame as illustrated in the drawings.

FIG. 17 also illustrates variations of the dam leg 111 discussed above in connection with FIGS. 12 and 13. For example, although the leg 111 is illustrated in other Figures with a return 115 (as shown, e.g., in FIG. 18), the return is optional and the leg can simply terminate with a straight edge as shown in FIG. 17.

As also illustrated in FIG. 17, an additional leg 113 can be provided to isolate the layer 112 from the adhesive that resides between the glazing panes. Such isolation would be desirable, for example, if the materials used for the adhesive 104 and the layer 112 were incompatible (e.g., chemically reactive with one another). Leg 113 has the additional advantage that it can be used to define a fixed space in which to apply the layer 112. Moreover, leg 113 can optionally be extended to be higher than leg 111, such that the extended portion will function as a setting block for the glazing pane 102, in which case setting blocks 130 will not be required. It is noted that legs 111, 113 can be rigid or flexible, depending on the requirements of the specific application. If layer 112 is not provided, the legs 111 and/or 113 can be eliminated.

FIG. 18 illustrates yet another embodiment wherein no internal dam leg (such as leg 113 in FIG. 17) is provided and the adhesives used have a low enough viscosity to migrate around the edges of the glazing panes and merge together, substantially filling the space between the support surface 110 and the glazing bead 108. In this structure, the glazing pane edges 140, 142 are embedded into the adhesive(s) used.

FIG. 19 is a perspective view that illustrates the use of spacer clips 150 that can be placed between the glazing panes 102, 106. In the embodiment shown, the spacer clips are L-shaped, such that they can be laid onto the adhesive 145 before the second glazing pane 106 is installed. The spacer clips can alternatively be of any other suitable shape, such as a U-shape or box shape, or can be implemented as corner clips. The spacer clips are intended to maintain a desired spacing between the inside surfaces of the glazing panes, and/or to hold the panes apart while the adhesive therebetween sets or cures.

Optionally, the spacer clips 150 can be used to secure a simulated muntin bar or grid 154 between the glazing panes. In this event, the clips 150 and the muntin bar(s) or grid 154 will have mating portions, such as an opening 152 in the spacer clip that receives a corresponding pin that extends from the muntin bar or grid. The mating portions can take any other suitable form, such as slots and pins, resilient clips, or the like.

FIGS. 20A to 20F illustrate the assembly of a slightly different embodiment of an integrated multipane window sash in accordance with the invention. In this embodiment, at least a portion of the adhesive is not applied until after the glazing panes are placed into position. Moreover, this embodiment lends itself to the use of different size glazing panes.

As illustrated in FIG. 20A, the assembly starts out with the sash frame 100, which includes a support surface 110 and optionally, a dam leg 111, as discussed above. In FIG. 20B, a first glazing pane 160 is placed adjacent to the support surface 110. An optional layer 112 can be provided on the support surface 110. As discussed above, the layer 112 can comprise, for example, a gasket or adhesive (e.g., sealant).

After the first glazing pane 160 has been installed into the sash frame, a spacer 162 is placed on the first glazing pane, e.g., along its inside surface perimeter, as shown in FIG. 20C. The spacer 162 can comprise, for example, a foam spacer with or without a separate glazing support. For example, a laminated spacer comprising foam and supporting metal (e.g., aluminum) layers can be used. Other types of spacers are also suitable, such as metal, plastic, rigid tape, adhesive layers and combinations thereof, etc. as discussed hereinabove. The spacer can also include a desiccant.

After the spacer 162 is provided, a second glazing pane 164 is set on top of the spacer, as indicated in FIG. 20D. The second glazing pane can be equal in size to the first glazing pane, or it can be of unequal size (e.g., smaller) as shown in the figure. A smaller size will facilitate the subsequent application of adhesive, as illustrated in FIG. 20E, where sealant (or other adhesive) 166 is provided to back-fill the glazing panes and spacer. For example, the sealant or other adhesive 166 can be pumped into the cavity between the sash frame 100 and the spacer 162 via a nozzle, which may, e.g., be robotically controlled. Manual application is also possible. After the adhesive is injected into the cavity (or otherwise applied) as shown in FIG. 20E, the glazing bead 108 is installed as shown in FIG. 20F. It is noted that although the adhesive 166 illustrated in FIGS. 20E and 20F extends all the way from the spacer 162 to the inside perimeter of the sash frame 100 (thereby completely filling the cavity), this does not have to be the case. The adhesive can instead extend from the spacer to any point between the spacer and the sash frame, e.g., from the spacer to the edge of glazing pane 164 or from the spacer to the edge of glazing pane 160. An embodiment where the adhesive 166' extends from spacer 162 to the edge 190 of the upper pane, instead of all the way to the inside perimeter 101 of sash frame 100, is illustrated in FIG. 28.

FIGS. 21 to 25 illustrate various possible designs for the spacer 162. In FIG. 21, a straight spacer is shown. FIG. 22 shows a T-shaped spacer 162A, having a plurality of legs 161 that abut the inside perimeter of the sash frame. Due to the spacing between the legs, an adhesive can be applied via backfilling (as illustrated, e.g., in FIG. 20E), and the adhesive will flow between and around the legs to secure the spacer and glazing panes. FIG. 23 illustrates a T-shaped spacer 162B having extensions 163. The extensions can serve as a setting block for the lower glazing pane as shown in FIG. 23. As shown in FIG. 24, a T-shaped spacer 162C with dual leg extensions 165 can be provided, with the extensions provided setting blocks for both the lower and upper panes. Moreover, as shown in FIG. 25, a T-shaped spacer 162D can be provided with a raised setting block portion 167 for accommodating different size glass panes. As indicated above in connection with FIGS. 20A to 20F, the use of different size panes facilitates the backfilling of the assembly with an adhesive (e.g., adhesive 166 shown in FIG. 20E). It should be appreciated that spacers having other shapes can also be used in connection with the invention.

As an optional feature, the spacer between the glazing panes can accommodate, or include, simulated muntin bars. FIG. 26 illustrates a spacer 170 with integral simulated muntin bars 172. FIG. 27 illustrates a spacer 180 with a groove 182 for holding integral simulated muntin bars 184. Instead of the groove 182 being recessed into the spacer 180 as shown, it can be formed using parallel legs which extend from the spacer. Any other suitable structure, such as clips, pins or the like, can alternatively be used to mount or otherwise fasten a simulated muntin bar assembly or individual simulated muntin bars to the spacer.

It should now be appreciated that the present invention provides a method for fabricating an integrated sash structure, which includes a sash frame, an adhesive mounting arrangement, and glazing panes (such as glass or plastic) mounted to the adhesive mounting structure. The resulting assembly provides a single unit insulating sash without the need to manufacture a separate insulating glass (IG) unit, which must then be mounted into a separate sash frame. This structure provides significant efficiencies in manufacturing and provides a product with superior performance at a reduced cost.

In accordance with the invention, a sash frame is provided which has a glazing pane installation opening accessible from a first side thereof and a glazing pane support surface on a second side thereof. A first glazing pane is inserted into the opening. An outside surface perimeter of the pane is placed adjacent to the support surface (e.g., directly on the support surface or on an intervening layer such as a cushioning, adhesive and/or sealant layer). A second glazing pane is inserted into the opening and an inside surface perimeter of the second pane is mounted adjacent to an inside surface perimeter of said first glazing pane. A glazing bead is installed along at least a portion of the glazing pane installation opening after the glazing panes have been inserted. In one embodiment, an integrated one component desiccated/sealant-adhesive is provided to mount the glazing panes together with a space therebetween. The space can be filled with an inert gas, such as Argon, to improve the insulating qualities of the finished unit.

Various other mounting arrangements are also contemplated in accordance with the present invention. For example, instead of mounting subsequent glazing panes directly to previous glazing panes via an adhesive, the panes can be mounted adjacent to one another via spacing clips or the like, via projections from the sash frame, or via other structures that allow the fabrication of an integrated insulating glass and sash assembly by inserting glazing panes through an installation opening in the sash frame.

Although the invention has been described in connection with several particular embodiments, it will be appreciated that various adaptations and modifications may be made thereto without departing from the scope of the invention, as set forth in the claims.

What is claimed is:

1. A method for fabricating an integrated multipane window sash comprising:

providing a sash frame having a common glazing pane installation opening for at least two glazing panes, said opening being accessible from a first side of said sash frame and a glazing pane support surface on a second side thereof, said opening being defined by a shelf extending transversely from said glazing pane support surface around a perimeter of said sash frame;

first, inserting a first glazing pane into said opening from said first side and placing an outside surface perimeter of said pane adjacent to said support surface with a first adhesive therebetween;

second, inserting a second glazing pane into said opening from said first side and mounting an inside surface perimeter of said second pane to an inside surface perimeter of said first glazing pane via a second adhesive; and third, installing at least one glazing bead along at least a portion of the glazing pane installation opening after the glazing panes have been inserted.

2. A method in accordance with claim 1 wherein at least one additional glazing pane is inserted into said opening and mounted adjacent to a previous glazing pane prior to said glazing bead installing step.

3. A method in accordance with claim 1 wherein at least one of said first and second adhesive is an adhesive sealant or foam.

4. A method in accordance with claim 1 wherein said second adhesive is applied to at least a portion of the inside surface perimeter of said first glazing pane.

5. A method in accordance with claim 1 wherein said second adhesive is applied to at least a portion of the inside surface perimeter of said second glazing pane.

6. A method in accordance with claim 1 wherein said second adhesive is applied to at least a portion of said sash frame.

7. A method in accordance with claim 1 wherein each of said first and second adhesives comprises at least one of:

(i) a bead of adhesive, (ii) a preformed adhesive foam, (iii) an expanding adhesive foam, (iv) a preformed adhesive tape, (v) a desiccated adhesive, (vi) a chemical sealant.

8. A method in accordance with claim 1 wherein said first and second adhesives comprise the same material.

9. A method in accordance with claim 1 wherein said first and second adhesives comprise an adhesive sealant.

10. A method in accordance with claim 1 wherein said support surface comprises a lip extending around the second side of said sash frame.

11. A method in accordance with claim 1 comprising the further step of providing a desiccant between said first and second glazing panes.

12. A method in accordance with claim 1 wherein said glazing bead exerts pressure on the outside surface perimeter of the last glazing pane inserted into said glazing pane installation opening, thereby biasing the glazing panes toward said support surface.

13. A method in accordance with claim 1, comprising the further step of providing setting blocks on said sash frame to facilitate positioning of at least one of said glazing panes.

14. A method in accordance with claim 1, wherein the first glazing pane is mounted to float on the support surface and the second glazing pane is mounted to float on said first glazing pane, such that the glazing panes function independently with respect to stresses.

15. A method in accordance with claim 1, wherein:

the outside surface perimeter of said first glazing pane is adhesively mounted to said support surface via an adhesive that is applied to at least a portion of the support surface by co-extrusion with a sash profile used to fabricate said sash frame.

16. A method in accordance with claim 1, wherein:

the outside surface perimeter of said first glazing pane is adhesively mounted to said support surface via an adhesive that is applied to at least a portion of the support surface by extrusion after fabrication of said sash frame.

17. A method in accordance with claim 1, comprising:

applying said first adhesive to at least a portion of the outside surface perimeter of said first glazing pane and then adhesively mounting said first glazing pane to said support surface.

18. A method in accordance with claim 1 wherein:

at least one of said glazing panes is mounted within said sash frame using an adhesive; and edges of said at least one glazing pane are at least partially embedded into the adhesive.

19. A method in accordance with claim 1, wherein the second pane is mounted to said first pane with a space therebetween.

20. A method in accordance with claim 19 comprising the further steps of:

filling said space with an inert gas; and sealing the space to prevent leakage of said gas therefrom.

21. A method in accordance with claim 1, further comprising installing at least one spacing clip between said first and second glazing panes.

22. A method in accordance with claim 21, wherein said spacing clip is adapted to secure at least one muntin bar within a space defined by the spacing clip between said first and second glazing panes.

23. A method in accordance with claim 1, further comprising applying an adhesive between said glazing bead and an adjacent glazing pane.

24. A method in accordance with claim 1, further comprising installing a gasket between said glazing bead and an adjacent glazing pane.

25. A method in accordance with claim 1, wherein edges of said glazing panes are substantially completely embedded in adhesive.

26. A method in accordance with claim 1 wherein said second pane is mounted to said first pane via a spacer.

27. A method in accordance with claim 26 further comprising filling a cavity between said spacer and an inside perimeter of said sash frame with an adhesive.

28. A method in accordance with claim 27 wherein said cavity is partially filled from the spacer toward the sash frame, without the adhesive contacting the inside perimeter.

29. A method in accordance with claim 27 wherein said cavity is substantially completely filled from the spacer to said inside perimeter, with the adhesive contacting the inside perimeter.

30. A method in accordance with claim 27, wherein edges of said glazing panes are at least partially embedded in said adhesive.

31. A method in accordance with claim 26 comprising using a portion of said spacer as a setting block for at least one glazing pane.

32. A method in accordance with claim 26 wherein at least a portion of said spacer is T-shaped.

33. A method in accordance with claim 32 wherein said spacer includes a setting block portion.

34. A method in accordance with claim 26 further comprising providing at least one simulated muntin bar integral with said spacer.

35. A method in accordance with claim 26 further comprising providing said spacer with a mounting element for at least one simulated muntin bar.

36. A method in accordance with claim 35 wherein said mounting element comprises a groove associated with said spacer.

37. A method in accordance with claim 26 wherein said spacer comprises at least one of:

(i) a bead of adhesive, (ii) a bead of desiccant, (iii) a preformed rigid material, (iv) a preformed or expanding foam, (v) a preformed adhesive (vi) a preformed desiccant material.

38. A method in accordance with claim 26 wherein the glazing panes are of unequal size.

39. A method in accordance with claim 1 wherein said glazing bead comprises a rigid strip that is attached to said sash frame.

40. A method in accordance with claim 1 wherein said glazing bead comprises a flexible adhesive material.

41. A method in accordance with claim 1, comprising:

applying an adhesive between at least a portion of the outside surface perimeter of said first glazing pane and said support surface, and providing a first dam leg between said support surface and an inside perimeter of said sash frame to isolate the adhesive from a space between said first and second glazing panes.

42. A method in accordance with claim 41, comprising:

providing a second dam leg in parallel with said first dam leg such that said adhesive is constrained between the dam legs.

* * * * *